US011511967B2

(12) United States Patent
Hattori et al.

(10) Patent No.: US 11,511,967 B2
(45) Date of Patent: Nov. 29, 2022

(54) BASE ISOLATION APPARATUS, LIFTING APPARATUS, AND BASE ISOLATION UNIT

(71) Applicant: Mitsubishi Electric Corporation, Chiyoda-ku (JP)

(72) Inventors: Tomoya Hattori, Chiyoda-ku (JP); Noboru Kawaguchi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 792 days.

(21) Appl. No.: 16/341,193

(22) PCT Filed: Oct. 26, 2017

(86) PCT No.: PCT/JP2017/038761
§ 371 (c)(1),
(2) Date: Apr. 11, 2019

(87) PCT Pub. No.: WO2018/079673
PCT Pub. Date: May 3, 2018

(65) Prior Publication Data
US 2019/0315595 A1     Oct. 17, 2019

(30) Foreign Application Priority Data

Oct. 27, 2016  (JP) .............................. JP2016-210738

(51) Int. Cl.
*B66B 7/02* (2006.01)
*B66B 9/00* (2006.01)
(Continued)

(52) U.S. Cl.
CPC ................ *B66B 7/028* (2013.01); *B66B 9/00* (2013.01); *B66B 9/06* (2013.01); *E04B 1/98* (2013.01); *E04H 9/0235* (2020.05); *B66B 5/022* (2013.01)

(58) Field of Classification Search
CPC ......... B66B 5/022; B66B 7/028; B66B 9/187; B66B 9/06; E04H 9/0235; E04B 1/98
See application file for complete search history.

(56) References Cited

U.S. PATENT DOCUMENTS

| 5,689,919 A | 11/1997 | Yano |
| 2006/0179729 A1* | 8/2006 | Li ........................... F16F 15/06 52/167.7 |
| 2018/0283487 A1 | 10/2018 | Hattori et al. |

FOREIGN PATENT DOCUMENTS

| JP | 5-196090 A | 8/1993 |
| JP | 11200659 A * | 7/1999 |

(Continued)

OTHER PUBLICATIONS

Machine Translation of JPH 11-200659.*

(Continued)

*Primary Examiner* — Diem M Tran
(74) *Attorney, Agent, or Firm* — Oblon, McClelland, Maier & Neustadt, L.L.P.

(57) ABSTRACT

A structure having limited supportable portions has been difficult to isolate from vibration in the direction in which a load is applied. A base isolation apparatus includes a Z-axis base isolation unit, an X-axis base isolation unit, and a Y-axis base isolation unit. The base isolation unit includes a vibration-source connector, an isolated-object connector, a lock device disposed between the isolated-object connector and the vibration-source connector for switching between a state of fixing the isolated-object connector and a state of making it movable, a distance recovery device for generating a force to cause an amount of change in distance to approach zero, depending on the amount of change, and a vibration damper for generating a force in an orientation of hindering the change, depending on the rate of change in distance.

22 Claims, 22 Drawing Sheets

(51) Int. Cl.
*B66B 9/06* (2006.01)
*E04B 1/98* (2006.01)
*E04H 9/02* (2006.01)
*B66B 5/02* (2006.01)

(56) References Cited

FOREIGN PATENT DOCUMENTS

| | | | |
|---|---|---|---|
| JP | 3014034 B2 | 2/2000 | |
| JP | 2001163548 A * | 6/2001 | ............ B66B 7/024 |
| JP | 3860813 B2 | 12/2006 | |
| WO | WO 2017/056265 A1 | 4/2017 | |

OTHER PUBLICATIONS

Machine Translation JP 2001163548.*
International Search Report dated Jan. 9, 2018 in PCT/JP2017/038761 filed Oct. 26, 2017.

* cited by examiner (A) (B)

(A)  (B)

BASE ISOLATION APPARATUS, LIFTING APPARATUS, AND BASE ISOLATION UNIT

TECHNICAL FIELD

The present disclosure relates to a base isolation apparatus for isolating a structure from vibration, a lifting apparatus equipped with the base isolation apparatus, and a base isolation unit for use in the base isolation apparatus.

BACKGROUND ART

A base isolation apparatus is installed between an object to be isolated from vibration, and a foundation of the object. The base isolation apparatus is installed for decoupling respective behaviors of the object and the foundation from each other to prevent seismic vibration from being transmitted to the object, or to reduce a seismic acceleration applied to the object. A known base isolation technology for rack-and-pinion type elevators often employed for construction-site elevators provides a horizontal base isolation apparatus installed only on an elevator's foundation on the ground (see Patent Document 1).

It is known to provide a rolling support and a damper for suppressing vibration in a horizontal plane, lock the rolling support and the damper so that they do not work while no earthquake occurs, and release the locked rolling support and damper upon occurrence of an earthquake so as to cause the rolling support and the damper to work (see Patent Document 2). It is known to utilize a ball screw mechanism for restricting, in the up-and-down direction, the direction in which an additional mass moves, in order to suppress up-and-down vibration. For small vibration, the additional mass is driven to implement active vibration control. For large vibration, the additional mass is not driven. In order to accomplish this, a clutch is mounted on one end of a screw rod of the ball screw mechanism. When the additional mass is driven actively to implement vibration control, the clutch prevents the screw rod from rotating. For large vibration, the clutch allows the screw rod to rotate freely to thereby allow the additional mass to move up and down freely (see Patent Document 3).

CITATION LIST

Patent Document

Patent Document 1: Japanese Patent No. 3860813
Patent Document 2: Japanese Patent No. 3014034
Patent Document 3: Japanese Patent Laid-Open No. H05-196090

SUMMARY OF INVENTION

Technical Problem

A base isolation apparatus of Patent Document 1 requires a building structure to be isolated from horizontal vibration. If the building structure is not isolated from horizontal vibration, only a lower portion of the elevator is isolated from vibration while an upper portion of the elevator is not isolated from vibration. The rack-and-pinion type elevator has limited portions that can be supported. Therefore, while it is easy for a base isolation apparatus mounted on a to-be-supported portion to isolate the elevator from vibration in a horizontal plane in which no load is applied, it is difficult for the base isolation apparatus to isolate the elevator from vibration in the up-and-down direction in which a load is applied. For any structures having limited portions that can be supported, other than the rack-and-pinion type elevator, it is difficult to isolate such structures from vibration in the up-and-down direction in which a load is applied.

While a damping apparatus of Patent Document 3 suppresses up-and-down vibration, the damping apparatus does not implement base isolation by preventing vibration from being transmitted to an object to be isolated. The screw mechanism is not used for a locking mechanism configured to switch between a state of fixing an object (object to be isolated from vibration) to a structure and a state of making the object movable. Moreover, the additional mass is movable also while the clutch is fixed.

The present disclosure is provided to solve the problems set forth above, and an object of the present disclosure is to isolate a structure having limited supportable portions from vibration in the direction in which a load is applied.

Solution to Problem

A base isolation unit according to the present disclosure includes: a vibration-source connector to be connected with a structure or a ground subjected to seismic vibration; and an isolated-object connector to be connected with an object to be isolated from vibration, the isolated-object connector being disposed movably with respect to the vibration-source connector in a predetermined base isolation direction.

Further, between the vibration-source connector and the isolated-object connector, the base isolation unit includes: a lock device configured to switch between a state of fixing the isolated-object connector with respect to the vibration-source connector and a state of making the isolated-object connector movable; a distance recovery device configured to generate a force for causing an amount of change of a distance between the isolated-object connector and the vibration-source connector to approach zero, depending on the amount of change, the amount of change being a change from the distance in a state in which the lock device fixes the isolated-object connector with respect to the vibration-source connector, the distance recovery device including a tensile-side elastic body to which an external force is applied as a pressure along the base isolation direction in an orientation of increasing the distance, and a compressive-side elastic body to which a preload is applied, the preload being the external force applied to the compressive-side elastic body as a pressure in an orientation of decreasing the distance; and a vibration damper configured to generate a force in the orientation of decreasing the distance as the distance increases, and to generate a force in the orientation of increasing the distance as the distance decreases.

Advantageous Effects of Invention

The base isolation apparatus and the base isolation unit in the present disclosure are capable of isolating a structure from vibration in the direction in which a load is applied, where the structure has limited portions that can be supported.

DESCRIPTION OF EMBODIMENTS

Figure 1:
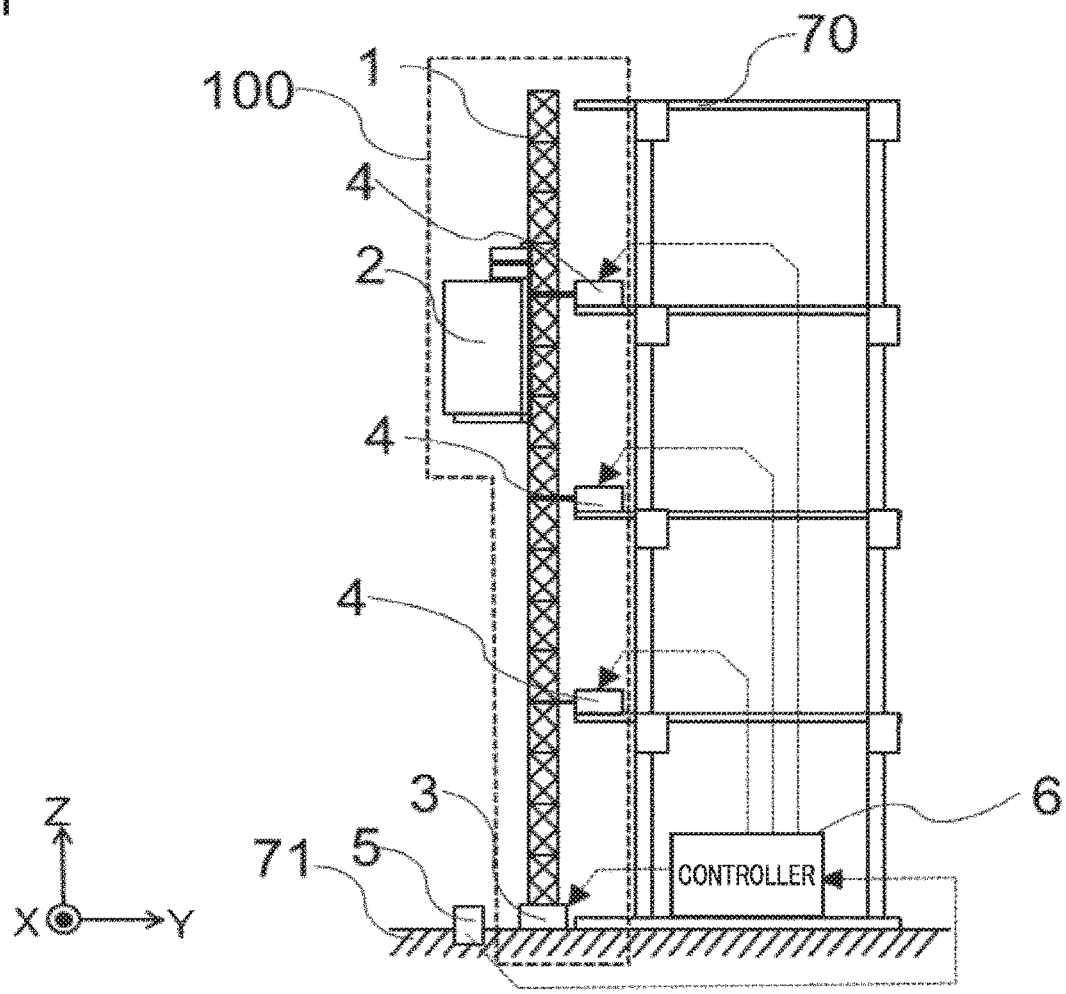
FIG. 1 illustrates a configuration of a lifting apparatus in a first embodiment of the present disclosure.

In the following, embodiments of the present disclosure are described with reference to the drawings. In the following drawings, the same or corresponding parts are denoted by the same reference numerals, and a description thereof is not repeated.

First Embodiment

FIG. 1 illustrates a configuration of a lifting apparatus in a first embodiment of the present disclosure. Lifting apparatus 100 is a construction-site elevator to be used for construction of a four-floor building structure 70, for example. Lifting apparatus 100 includes a mast 1, a cage 2, a base isolation apparatus 3, and a base isolation apparatus 4. Mast 1 is disposed vertically along building structure 70. Cage 2 is lifted and lowered along mast 1. Base isolation apparatus 3 is placed between mast 1 and a ground 71. For each floor of building structure 70, base isolation apparatus 4 is mounted at a place where building structure 70 supports mast 1. It may not be the ground but a structure that is located under mast 1.

A seismic sensor 5 is placed at ground 71 in the vicinity of base isolation apparatus 3. Seismic sensor 5 outputs seismic detection information upon detecting an acceleration more than or equal to a threshold value. The seismic detection information is information for conveying the fact that an earthquake occurred. A controller 6 for controlling base isolation apparatuses 3, 4 is placed in a control room for example in building structure 70. The seismic detection information from seismic sensor 5 is input to controller 6.

Controller 6 is connected to a public network (not shown) and can receive emergency earthquake information or the like delivered from the Japan Meteorological Agency.

Mast 1 is placed at a predetermined position with respect to building structure 70, with base isolation apparatus 3 disposed under mast 1. Mast 1 is also supported by structure 70. Cage 2 is a box-like structure that can carry a person(s) or an object(s). Lifting apparatus 100 is of the rack-and-pinion type. Mast 1 is equipped with a rack (not shown). The rack is a flat plate toothed between guide rails for guiding cage 2. A pinion (not shown) is placed on an upper portion of cage 2. The pinion is a gear toothed to be engaged with the teeth of the rack. A motor (not shown) mounted on cage 2 causes the pinion to rotate to thereby cause the pinion, that is, cage 2 to move with respect to the rack, that is, mast 1.

Figure 2:
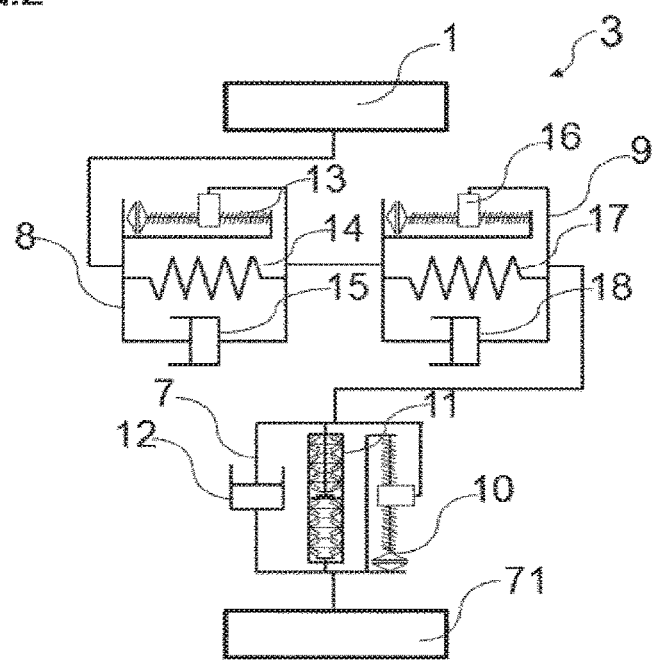
FIG. 2 is a schematic configuration diagram of a base isolation apparatus applied under the lifting apparatus in the first embodiment.

FIG. 2 is a schematic configuration diagram of base isolation apparatus 3 applied under a lifting apparatus. Base isolation apparatus 3 includes a Z-axis base isolation unit 7, an X-axis base isolation unit 8, and a Y-axis base isolation unit 9. Z-axis base isolation unit 7 is a load-direction base isolation unit configured to isolate seismically mast 1, which is an object to be isolated from vibration, from ground 71 in the vertical direction (Z-axis direction). X-axis base isolation unit 8 is a first-direction base isolation unit configured to isolate mast 1 from vibration in the X-axis direction (first direction) in a horizontal plane. Y-axis base isolation unit 9 is a second-direction base isolation unit configured to isolate mast 1 from vibration in the Y-axis direction (second direction) orthogonal to the X-axis direction in the horizontal plane. The first direction and the second direction may not be orthogonal to each other, but may be two different directions in the horizontal plane.

In FIG. 2, the vertical direction is shown as the top-to-bottom direction on the drawing, and the directions in the horizontal plane are shown as horizontal directions. X-axis base isolation unit 8 and Y-axis base isolation unit 9 configured to accomplish base isolation in the horizontal plane are arranged actually so that one of them is located at a higher level and the other is located at a lower level. For the sake of avoiding complexity, FIG. 2 shows X-axis base isolation unit 8 and Y-axis base isolation unit 9 at the same level in the top-to-bottom direction.

In base isolation apparatus 3, X-axis base isolation unit 8, Y-axis base isolation unit 9, and Z-axis base isolation unit 7 are arranged in this order from the mast 1 side. Mast 1 which is an object to be isolated from vibration is supported by X-axis base isolation unit 8. Mast 1 and X-axis base isolation unit 8 are supported by Y-axis base isolation unit 9. Mast 1, X-axis base isolation unit 8, and Y-axis base isolation unit 9 are supported by Z-axis base isolation unit 7. Z-axis base isolation unit 7 is supported by ground 71.

X-axis base isolation unit 8 allows mast 1 to be movable in the X-axis direction with respect to Y-axis base isolation unit 9 in the event of an earthquake. Y-axis base isolation unit 9 allows X-axis base isolation unit 8 and mast 1 to be movable in the Y-axis direction with respect to Z-axis base isolation unit 7 in the event of an earthquake. Z-axis base isolation unit 7 allows Y-axis base isolation unit 9, X-axis base isolation unit 8, and mast 1 to be movable in the Z-axis direction with respect to ground 71 in the event of an earthquake.

The direction in which a base isolation unit isolates an object from vibration is referred to herein as "base isolation direction." "Base isolation" means reduction of an acceleration applied to the object to be isolated from vibration in the event of an earthquake. "Object to be isolated from vibration" is an object to which seismic vibration is prevented from being transmitted.

Z-axis base isolation unit 7 includes a Z-axis lock mechanism 10, as well as a Z-axis preloaded spring 11 and a Z-axis damper 12 that are placed in parallel with Z-axis lock mechanism 10. Z-axis lock mechanism 10 is a lock mechanism configured to switch between a state of locking mast 1 with respect to building structure 70 or ground 71 and a state of making mast 1 movable with respect to building structure 70 or ground 71. Z-axis preloaded spring 11 and Z-axis damper 12 are activated when Z-axis lock mechanism 10 releases the locking. Z-axis preloaded spring 11 supports a load applied from mast 1 and prevents vibration of ground 71 from being transmitted to mast 1. Z-axis damper 12 damps vibration energy. X-axis base isolation unit 8 includes an X-axis lock mechanism 13, an X-axis spring 14, and an X-axis damper 15 that are arranged in parallel with each other. Y-axis base isolation unit 9 includes a Y-axis lock mechanism 16, a Y-axis spring 17, and a Y-axis damper 18 that are arranged in parallel with each other. In each base isolation unit, the direction in which the spring and the damper (buffer) are compressed and stretched is referred to herein as main-axis direction. The base isolation unit is used in a state in which the main-axis direction is in parallel with the base isolation direction.

Figure 3:
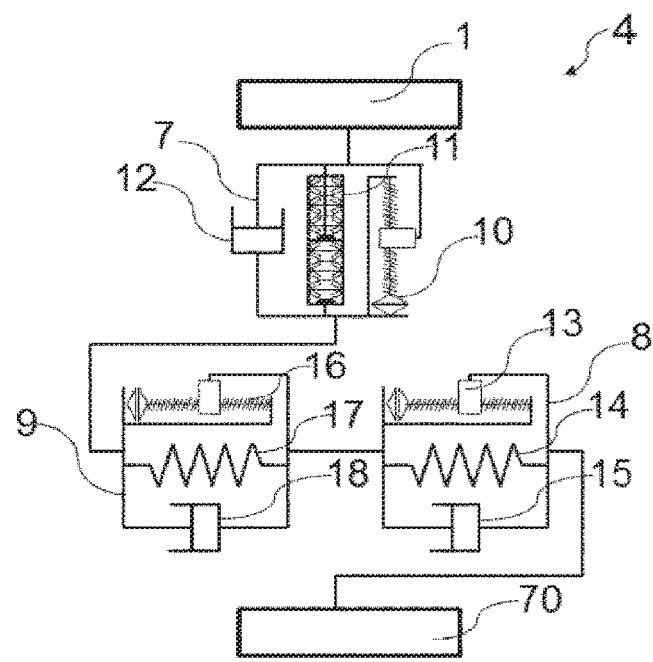
FIG. 3 is a schematic configuration diagram of a base isolation apparatus applied to a place where the lifting apparatus in the first embodiment is supported by a building structure.

FIG. 3 is a schematic configuration diagram of base isolation apparatus 4 applied to a place where mast 1 is supported by building structure 70. Like base isolation apparatus 3, base isolation apparatus 4 includes Z-axis base isolation unit 7, X-axis base isolation unit 8, and Y-axis base isolation unit 9. In base isolation apparatus 4, Z-axis base isolation unit 7 is located closest to mast 1 relative to other base isolation units. Mast 1 is thus supported by Z-axis base isolation unit 7. Mast 1 and Z-axis base isolation unit 7 are supported by Y-axis base isolation unit 9. Mast 1, Z-axis base isolation unit 7, and Y-axis base isolation unit 9 are supported by X-axis base isolation unit 8. X-axis base isolation unit 8 is supported by building structure 70.

In base isolation apparatus 4, Z-axis base isolation unit 7 allows mast 1 to be movable in the Z-axis direction with respect to Y-axis base isolation unit 9 in the event of an earthquake. Y-axis base isolation unit 9 allows Z-axis base isolation unit 7 and mast 1 to be movable in the Y-axis direction with respect to X-axis base isolation unit 8 in the event of an earthquake. X-axis base isolation unit 8 allows Y-axis base isolation unit 9, Z-axis base isolation unit 7, and mast 1 to be movable in the X-axis direction with respect to building structure 70 in the event of an earthquake.

Figure 4:
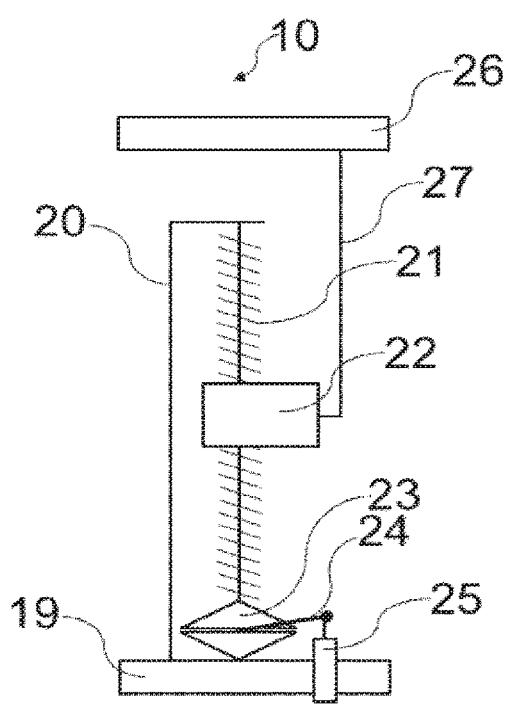
FIG. 4 is a schematic diagram illustrating a structure of a lock mechanism of a base isolation apparatus applied to the lifting apparatus in the first embodiment.

Z-axis lock mechanism 10, X-axis lock mechanism 13, and Y-axis lock mechanism 16 are identical in structure to each other. The structure of Z-axis lock mechanism 10 is described as an example of the structure of the lock mechanism. FIG. 4 shows a schematic diagram illustrating the structure of the lock mechanism. Z-axis lock mechanism 10 includes a structure connector 19, a ball screw housing 20, a screw rod 21, a ball screw nut 22, a clutch 23, a switch bar 24, a solenoid 25, an isolated-object connector 26, and a nut connector 27.

Structure connector 19 is connected to building structure 70 or ground 71. Ball screw housing 20 is fixed vertically to structure connector 19. Screw rod 21 is configured to be rotatable about a vertical axis between ball screw housing 20 and structure connector 19. Ball screw nut 22 has a through hole in which screw rod 21 is inserted. Clutch 23 fixes or releases screw rod 21 to or from structure connector 19. Switch bar 24 switches clutch 23 between fixing and releasing. Solenoid 25 changes the position of switch bar 24. Isolated-object connector 26 is connected to mast 1 which is an object to be isolated from vibration. Nut connector 27 connects ball screw nut 22 to isolated-object connector 26.

Structure connector 19 is a vibration-source connector to be connected with the structure or ground subjected to seismic vibration. Isolated-object connector 26 is connected to mast 1 which is an object to be isolated from vibration, and configured to be movable in the base isolation direction with respect to structure connector 19. The base isolation direction is a predetermined direction in which the base isolation unit isolates the object from vibration.

Male threads are formed in the outer surface of screw rod 21. In the through hole of ball screw nut 22, female threads to be engaged with the male threads of screw rod 21 are formed. Between the male threads on the screw rod 21 and the female threads in the through hole of ball screw nut 22, a ball is disposed. Therefore, in a state where there is substantially no frictional resistance, screw rod 21 can rotate with respect to ball screw nut 22. While ball screw nut 22 is movable in the axial direction of screw rod 21, ball screw nut 22 is inhibited from rotating about the axis. Therefore, as screw rod 21 rotates, ball screw nut 22 moves along the axis. Ball screw nut 22 is connected to isolated-object connector 26 through nut connector 27 having a fixed length. Therefore, even when ball screw nut 22 moves, the positional relation between ball screw nut 22 and isolated-object connector 26 keeps the same. As ball screw nut 22 moves, isolated-object connector 26 moves with respect to structure connector 19 and accordingly the distance between isolated-object connector 26 and structure connector 19 changes.

Clutch 23 is mounted on one end of screw rod 21. Clutch 23 takes a state of fixing screw rod 21 to structure connector 19 and a state of making screw rod 21 rotatable about the axis. The state of clutch 23 is changed depending on the state of switch bar 24. When switch bar 24 is located on the upper side, for example, clutch 23 and screw rod 21 are fixed with respect to structure connector 19. When switch bar 24 is located on the lower side, clutch 23 is separated from structure connector 19. Clutch 23 and screw rod 21 are in a rotatable state with respect to structure connector 19. Solenoid 25 applies an electromagnetic force to switch bar 24 to change the state of switch bar 24. Solenoid 25 is of the latch solenoid type. Solenoid 25 uses electricity for changing the position of switch bar 24. When no electricity is supplied, solenoid 25 maintains the same state.

Clutch 23 is fixed (locked) normally with respect to structure connector 19. In the event of an earthquake, a signal for releasing the locking is fed to Z-axis lock mechanism 10. Receiving the signal, solenoid 25 is activated. Solenoid 25 applies an electromagnetic force to switch bar 24 to change the position of switch bar 24. As the position of switch bar 24 is changed, clutch 23 is separated from structure connector 19. Screw rod 21 changes into a rotatable state. Consequently, when structure 70 or ground 71 vibrates, ball screw nut 22 moves to make it less likely that vibration is transmitted to isolated-object connector 26 and mast 1.

X-axis lock mechanism 13 and Y-axis lock mechanism 16 differ from Z-axis lock mechanism 10 in that the axis of screw rod 21 is directed in the X-axis direction or the Y-axis direction in a horizontal plane. In other respects, X-axis lock mechanism 13 and Y-axis lock mechanism 16 are similar in structure to Z-axis lock mechanism 10.

Ball screw housing 20 is fixed to structure connector 19 and therefore, the two ends of screw rod 21 are connected rotatably to structure connector 19. Ball screw housing 20 may be fixed to isolated-object connector 26, rather than structure connector 19. In this case, nut connector 27 is connected to structure connector 19. Structure connector 19 or isolated-object connector 26 to which ball screw housing 20 is fixed and the two ends of screw rod 21 are connected rotatably is referred to herein as "screw-rod-connected side connector." To the screw-rod-connected side connector, the two ends of screw rod 21 are connected rotatably about the axis so that the axis is in parallel with the base isolation direction. Ball screw housing 20 may be manufactured as an integrated unit with structure connector 19 or isolated-object connector 26. Without ball screw housing 20, the two ends of screw rod 21 may be connected to structure connector 19 or isolated-object connector 26.

The foregoing is explained in a different perspective. Ball screw nut 22 is a movable member having a through hole formed with female threads to engage with the male threads of screw rod 21 inserted in the through hole, the movable member is configured to move in the direction of the axis of screw rod 21 as screw rod 21 rotates, and having a fixed positional relation between the movable member and structure connector 19 or isolated-object connector 26 that is different from the screw-rod-connected side connector. Clutch 23, switch bar 24, and solenoid 25 constitute a switch device configured to inhibit or enable rotation of screw rod 21.

Use of the ball screw in the lock mechanism provides the following advantages: locking is effected easily at any position; low resistance is generated during movement of the ball screw nut along the ball screw upon releasing the locking; and depending on a load applied upon effecting the locking, the thickness of the ball screw and/or the size of the clutch can be determined appropriately.

As the lock mechanism, any mechanism different from the ball screw mechanism may be used. In order to change the state of the clutch, any device other than the solenoid may be used. As the lock mechanism, any mechanism other than the clutch may be used. Any lock mechanism may be used as long as it can switch between the state of fixing isolated-object connector 26 to structure connector 19 and the state of making isolated-object connector 26 movable.

X-axis spring 14 is a spring having an appropriate elastic modulus. For example, X-axis spring 14 is constituted of a predetermined number of disc springs arranged in series. One end of X-axis spring 14 is connected to structure connector 19. The other end of X-axis spring 14 is connected to isolated-object connector 26. Therefore, while X-axis lock mechanism 13 is in the locking state, no external force is applied to X-axis spring 14. While X-axis lock mechanism 13 is in the releasing state, an external force is applied to X-axis spring 14. X-axis spring 14 is stretched or compressed depending on the magnitude of the external force. X-axis spring 14 generates a force proportional to the stretched or compressed length of X-axis spring 14 under the Hooke's law. As to the direction of the force generated by X-axis spring 14, stretched X-axis spring 14 generates a force in the direction of compressing X-axis spring, and compressed X-axis spring 14 generates a force in the direction of stretching X-axis spring 14. The same applies to Y-axis spring 17.

Figure 5:
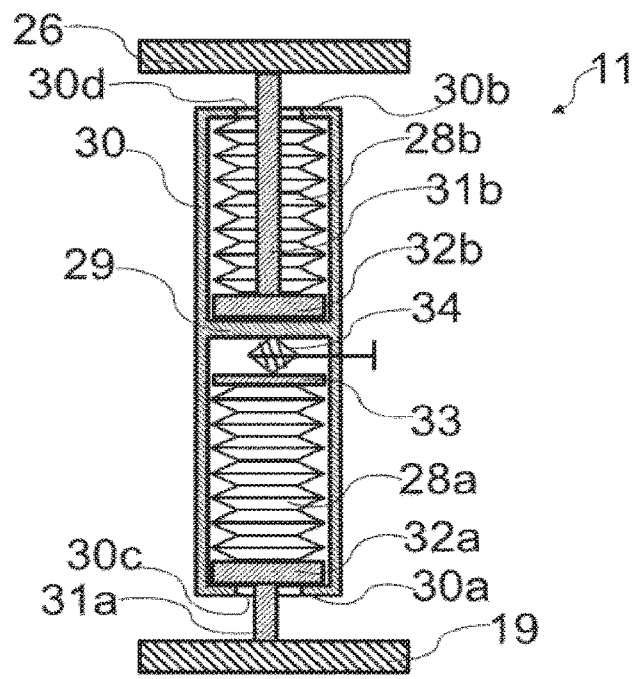
FIG. 5 is a schematic diagram illustrating a structure of a preloaded spring of the base isolation apparatus applied to the lifting apparatus in the first embodiment.

FIG. 5 is a schematic diagram illustrating a structure of Z-axis preloaded spring 11. Z-axis preloaded spring 11 includes two springs that are a compressive-side spring 28a and a tensile-side spring 28b. When an external compressive force is applied to Z-axis preloaded spring 11, compressive-side spring 28a is subjected to the pressure to compress. A pressure having a predetermined magnitude is applied in advance to compressive-side spring 28a. The length of compressive-side spring 28a is smaller than the natural length of the spring, because the pressure is applied in the main-axis direction. Application of a pressure in advance is referred to as "preload" and the magnitude of the pressure applied in advance (preload) is referred to as "preload value."

When an external force pulling both sides of Z-axis preloaded spring 11 is applied, tensile-side spring 28b is subjected to the pressure to compress. Tensile-side spring 28b is not preloaded. Compressive-side spring 28a and tensile-side spring 28b are accommodated in respective separate spaces in a casing 30 having a partition wall 29. Compressive-side spring 28a and tensile-side spring 28b are each a predetermined number of disc springs, for example.

The external shape of casing 30 is a cylindrical shape. Casing 30 has end faces 30a, 30b on the both sides in the main-axis direction, and these end faces have circular openings 30c, 30d, respectively. In openings 30c, 30d, columnar shafts 31a, 31b are inserted, respectively. Opening 30c is larger in diameter than shaft 31a and smaller in diameter than the disc springs. Opening 30d is larger in diameter than shaft 31b and smaller in diameter than the disc springs. Shaft 31b is smaller in diameter than a circular hole formed in the top side of the disc spring having a frustum shape as its external shape. Shaft 31b can therefore extend through tensile-side spring 28b to connect to a pressure member 32b. The disc springs constituting compressive-side spring 28a do not get out of opening 30c. Likewise, the disc springs constituting tensile-side spring 28b do not get out of opening 30d.

Shaft 31a has an end located inside casing 30, and a pressure member 32a is mounted on this end. Pressure member 32a is located between compressive-side spring 28a and end face 30a. Shaft 31a and pressure member 32a are not movable in the direction toward end face 30a, but movable in the direction toward compressive-side spring 28a. Shaft 31a has an end located outside casing 30, and this end is connected to structure connector 19.

Compressive-side spring 28a is in contact with a movable plate 33 at a side where partition wall 29 exists. Movable plate 33 is movable in casing 30. The distance between movable plate 33 and partition wall 29 can be changed by a preload adjuster 34. As the distance between movable plate 33 and partition wall 29 is changed, the length of compressive-side spring 28a is changed. There is a linear relation between the length of the spring and the external force under the Hooke's law. Therefore, the distance between movable plate 33 and partition wall 29 can be changed to change the preload value applied to compressive-side spring 28a. As preload adjuster 34, a mechanism such as jack or screw for example is used. Preload adjuster 34 may be any device as long as it can move movable plate 33 and keep the distance between movable plate 33 and partition wall 29. The preload adjuster is unnecessary if the length of the preloaded compressive-side spring and the length of the internal space of the casing in the main-axis direction are appropriately implemented. When the manufacture accuracy of the casing is low, the preload value can be adjusted appropriately by the preload adjuster. When the elastic modulus of the compressive-side spring has been changed through use over years, the preload adjuster can adjust the preload value to keep the preload value at a predetermined value.

The magnitude of the preload (preload value) applied to compressive-side spring 28a is set equal to the load applied from mast 1 to Z-axis preloaded spring 11 when locking by Z-axis lock mechanism 10 is released. In this way, it is possible to prevent the position of mast 1 from being lowered due to gravity acting upon releasing of the locking by Z-axis lock mechanism 10. The preload value may not be identical exactly to the load, as long as the difference between the preload value and the load is small as required and exists in a predetermined range.

Shaft 31b has an end located inside casing 30, and a pressure member 32b is mounted on this end. Pressure member 32b is located between tensile-side spring 28b and partition wall 29. Shaft 31b and pressure member 32b are not movable in the direction toward partition wall 29, but movable in the direction toward tensile-side spring 28b. Shaft 31b has an end located outside casing 30, and this end is connected to isolated-object connector 26. Alternatively, one end of shaft 31b may be connected to structure connector 19 and one end of shaft 31a may be connected to isolated-object connector 26.

Figure 6:
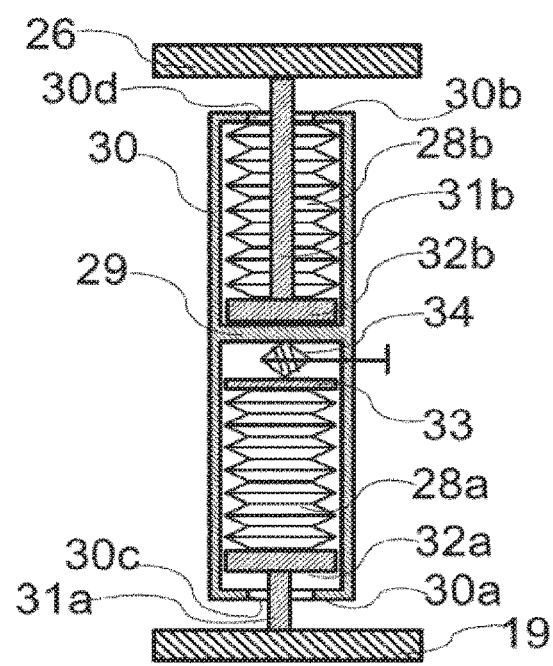
FIG. 6 is a schematic diagram illustrating a compressed state and a decompressed state of the preloaded spring of the base isolation apparatus applied to the lifting apparatus in the first embodiment.
Figure 6:
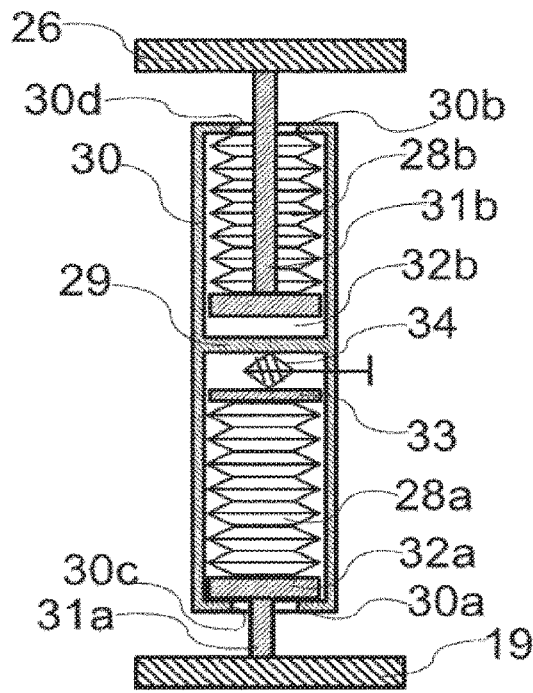

FIG. 6 shows schematically the preloaded spring in a compressed state and a stretched state. FIG. 6 (A) illustrates compression of the preloaded spring. FIG. 6 (B) illustrates stretch of the preloaded spring. As an external force larger than a preload value is applied in the direction of compressing Z-axis preloaded spring 11, pressure member 32a moves away from end face 30a while further compressing compressive-side spring 28a, to thereby shorten compressive-side spring 28a and Z-axis preloaded spring 11. Thus, compressive-side spring 28a is a preloaded elastic body (compressive-side elastic body) to which an external force is applied as a pressure in the direction of reducing the distance between structure connector 19 and isolated-object connector 26. Shaft 31a is a compressive-side shaft transmitting the external force to pressure member 32a. Pressure member 32a is a compressive force applicator connected to the compressive-side shaft for transmitting the force from the compressive-side shaft as a pressure to the compressive-side elastic body.

When the external force in the direction of compressing Z-axis preloaded spring 11 is less than or equal to the preload value, the length of compressive-side spring 28a and the length of Z-axis preloaded spring 11 remain the same. The preload value is set equal to a load applied from mast 1 to Z-axis preloaded spring 11 when locking by Z-axis lock mechanism 10 is released, and therefore, the external force smaller than the preload value does not be applied to Z-axis preloaded spring 11.

When the external force in the direction of compressing the preloaded spring is less than or equal to the preload value, the length of the preloaded spring keeps the same. It is therefore possible to use the preloaded spring as a lock device. For a large and heavy structure, it is effective to use the preloaded spring as the lock device. Because it is unnecessary to have a separate lock device, the base isolation apparatus can be simplified. When the preloaded spring is used as the lock device for a small structure that is not so heavy, the acceleration that releases the locking varies significantly as the weight of a carried person or load changes. The acceleration releasing the locking must be constant regardless of the carried person or load, and change of the acceleration releasing the locking is therefore undesirable for the lock device.

As shown in FIG. 6 (B), when an external force is applied in the direction of pulling Z-axis preloaded spring 11, pressure member 32b moves away from partition wall 29 while compressing tensile-side spring 28b, to thereby make Z-axis preloaded spring 11 longer. Thus, tensile-side spring 28b is an elastic body (tensile-side elastic body) to which an external force is applied as a pressure in the direction of increasing the distance between structure connector 19 and isolated-object connector 26. Shaft 31b is a tensile-side shaft transmitting the external force to pressure member 32b. Pressure member 32b is a tensile-force applicator connected to the tensile-side shaft for transmitting the force from the tensile-side shaft as a pressure to the tensile-side elastic body. The tensile-side pressure member is in contact with a side of the spring, and this side is located far from the opening of the casing. The compressive-side pressure member is in contact with a side of the spring, and this side is located to face the opening of the casing.

When the external force in the compressing direction is applied to Z-axis preloaded spring 11, tensile-side pressure member 32b and partition wall 29 press each other. Therefore, when the external force in the compressing direction is applied to Z-axis preloaded spring 11, no pressure is applied to tensile-side spring 28b.

When the external force in the stretching direction is applied to Z-axis preloaded spring 11, the external stretching force is applied also to shaft 31a. At this time, while compressive-side pressure member 32a pulls end face 30a, shaft 31a is not movable with respect to casing 30. Therefore, when the external force in the stretching direction is applied to Z-axis preloaded spring 11, no pressure is applied to compressive-side spring 28a.

The foregoing is explained in a different perspective. Casing 30 includes a portion including partition wall 29 and extending from partition wall 29 toward isolated-object connector 26. This portion is a tensile-side casing accommodating tensile-side spring 28b as a tensile-side elastic body and having opening 30d in the end face located to face isolated-object connector 26 in the base isolation direction. Casing 30 includes a portion including partition wall 29 and extending from partition wall 29 toward structure connector 19. This portion is a compressive-side casing accommodating compressive-side spring 28a as a compressive-side elastic body and having opening 30c in the end face located to face structure connector 19 in the base isolation direction. This opening is located in the side where the tensile-side casing is not located. In the first embodiment, the tensile-side casing and the compressive-side casing are defined by separating a single casing by the partition wall, and share the partition wall. The tensile-side casing and the compressive-side casing may be separate casings having a fixed relation between respective relative positions. The compressive-side casing may be disposed to face isolated-object connector 26 and the tensile-side casing may be disposed to face structure connector 19.

Figure 7:
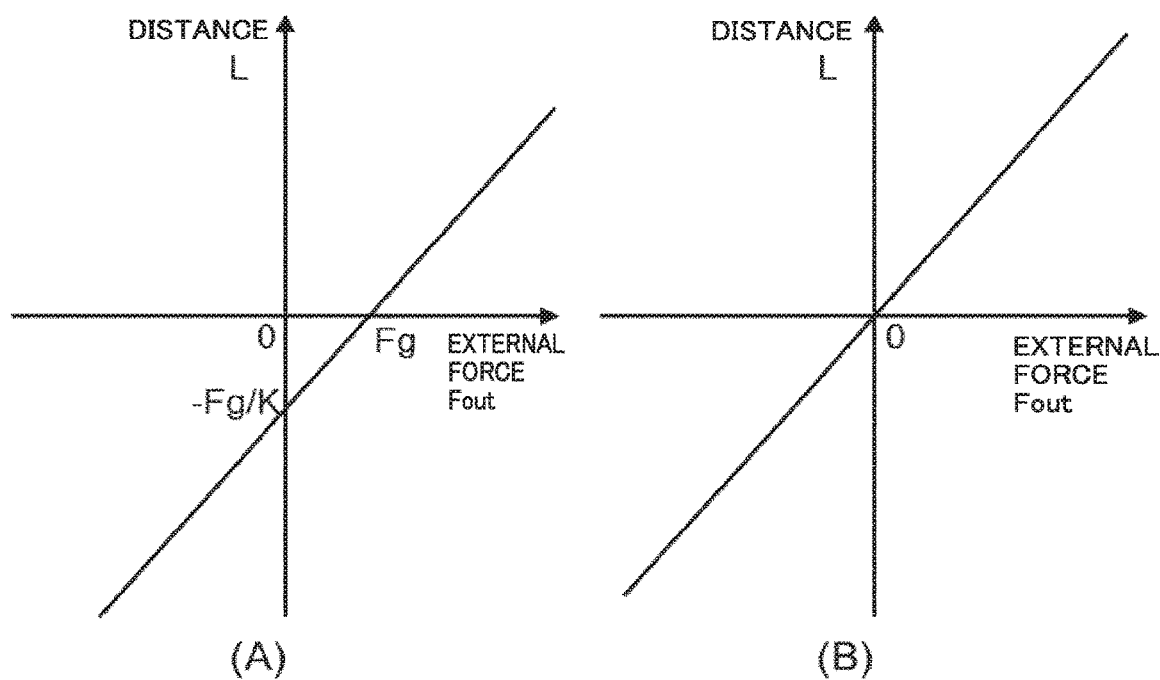
FIG. 7 illustrates effects derived from the fact that a vertical-direction base isolation unit of the base isolation apparatus applied to the lifting apparatus in the first embodiment has a preloaded spring.

Based on FIG. 7, effects derived from use of Z-axis preloaded spring 11 are described. FIG. 7 illustrates the effects derived from use of Z-axis preloaded spring 11 in Z-axis base isolation unit 7. FIG. 7 (A) illustrates use of a spring which is not preloaded. FIG. 7 (B) illustrates use of a preloaded spring. In FIG. 7, the horizontal axis represents external force Fout applied to Z-axis base isolation unit 7. External force Fout does not include load Fg whish is applied due to gravity. To Z-axis base isolation unit 7, external force Fout and load Fg are applied. Upward external force Fout is referred to as positive external force (Fout>0). The vertical axis represents the distance between structure connector 19 and isolated-object connector 26 in Z-axis base isolation unit 7. Distance L is expressed as an amount of change from the distance in a state where Z-axis lock mechanism 10 fixes the distance. L>0 means that the distance is increased, and L<0 means that the distance is decreased. The elastic modulus of the spring is represented by K.

As shown in FIG. 7 (A), when the non-preloaded spring is used, load Fg acts on the spring to which no external force Fout is applied (Fout=0), and therefore, L=−(Fg/K)<0 holds. When external force Fout equal to load Fg is applied (Fout=Fg), L=0 holds. When a preloaded spring to which a preload having a preload value equal to load Fg is applied is used, distance L is directly proportional to external force Fout as shown in FIG. 7 (B). When no external force Fout is applied (Fout=0), L=0 holds. In Z-axis base isolation unit 7 for isolating an object from vibration in the vertical direction, Z-axis preloaded spring 11 to which a preload of the same magnitude as load Fg is applied in advance is used. Accordingly, load Fg is cancelled and external force Fout and distance L are directly proportional to each other. Because external force Fout and distance L are directly proportional to each other, the distance in the state where Z-axis lock mechanism 10 effects the locking can be recovered in response to external force Fout=0.

No load is applied to X-axis base isolation unit 8 and Y-axis base isolation unit 9, and therefore, X-axis spring 14 and Y-axis spring 17 that are not preloaded can be used. In response to returning of external force Fout to be zero, X-axis base isolation unit 8 and Y-axis base isolation unit 9 can recover the distance in the state where X-axis lock mechanism 13 and Y-axis lock mechanism 16 effect the locking.

Z-axis preloaded spring 11, X-axis spring 14, and Y-axis spring 17 are each a distance recovery device disposed between structure connector 19 and isolated-object connector 26 for generating a force that causes the amount of change in the distance between structure connector 19 and isolated-object connector 26 to approach zero, depending on the amount of change in the distance. The amount of change in the distance is the amount of change of the distance, relative to the distance in the state where the lock mechanism fixes the distance.

Z-axis damper 12 is a damper (buffer) including a shaft subjected to a force in the main-axis direction to move linearly, and the damper generates a force in the direction of hindering the movement of the shaft. Z-axis damper 12 generates a force in the direction of hindering the movement of the shaft, depending on the moving speed of the shaft. Z-axis damper 12 is made up of, for example, a tube filled with a viscous liquid, a portion encountering a resistance from the liquid in the tube, and a shaft connected to the portion encountering the resistance.

As to X-axis damper 15, linear movement in the X-axis direction is converted into rotation and transmitted to X-axis damper 15, and X-axis damper 15 generates a force in the direction of hindering the rotation. X-axis damper 15 includes a rotation converter to convert linear motion into rotational motion, and a resistance generator to generate a resistance against the rotation. The resistance generator is made up of a cylinder filled with a viscous liquid, and a member rotating in the cylinder to encounter resistance. The rotation converter is made up of, for example, a pinion (gear) connecting to a rotational shaft of a rotational member of the resistance generator, and a rack which is a flat plate toothed to engage with the pinion. Y-axis damper 18 has a similar structure to X-axis damper 15.

The damper may be any device as long as it generates a force in the direction of hindering movement, depending on the moving speed.

Z-axis damper 12, X-axis damper 15, and Y-axis damper 18 are each disposed between structure connector 19 and isolated-object connector 26 for generating a force in the direction of decreasing the distance between structure connector 19 and isolated-object connector 26, as the distance increases, and generating a force in the direction of increasing the distance, as the distance decreases.

When the spring and the damper are present between a vibration source member and an object to be isolated from vibration, vibration of the vibration-source member is transmitted to the object after the lock device releases the locking. In this sense, the spring and the damper are not desirable. If the spring and the damper are absent, ideal base isolation is accomplished and the acceleration applied to the object can be reduced. If the spring and the damper are absent, however, the distance between the object and the vibration source member has to be several meters, for example, resulting in the need for a large-sized base isolation unit. The base isolation unit is required to reduce the amount of displacement of the object to exist within a range from approximately 50 mm to approximately several hundreds of mm, for example. The spring and the damper can reduce the acceleration applied to the object to thereby reduce the change in distance between the vibration source member and the object to exist within an allowable range.

The elastic modulus of the spring and the damping coefficient of the damper are determined in the following way, for example. The seismic frequency is approximately 2 Hz to 6 Hz. The natural frequency of the spring used for the base isolation unit has to be a lower frequency, approximately 1 Hz, for example, than the seismic frequency. The elastic modulus of the spring is determined from the natural frequency of the spring. In consideration of trade-off between the amount of displacement and the acceleration applied to the object, the amount of displacement is determined. The damping coefficient of the damper is determined so that the determined amount of displacement is achieved.

Figure 8:
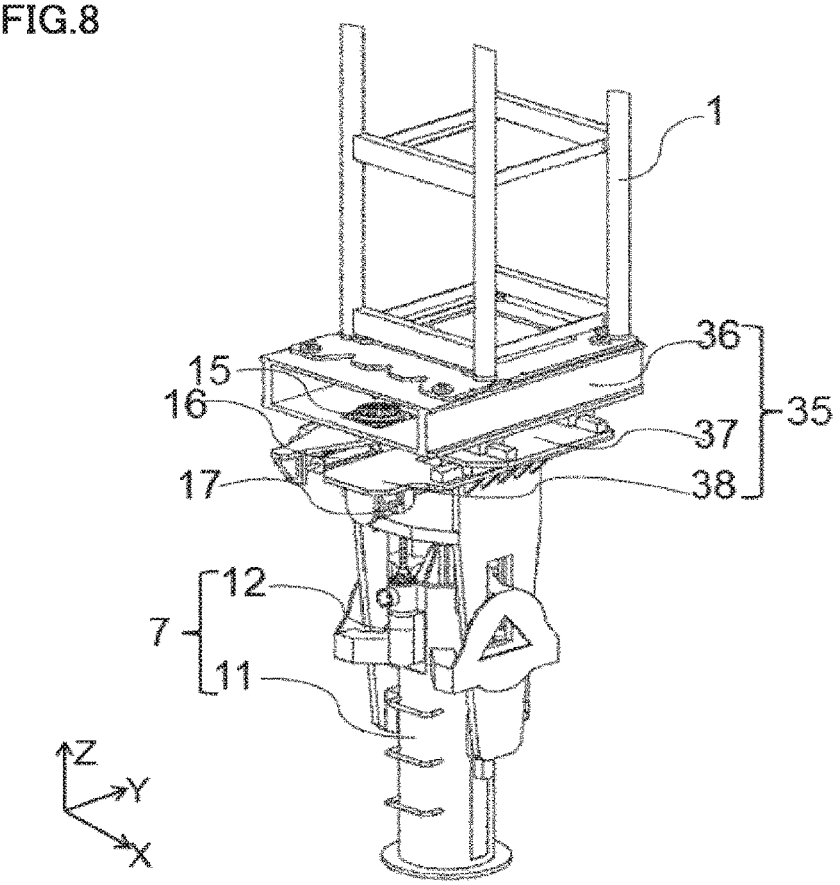
FIG. 8 is a perspective view of the base isolation apparatus applied under the lifting apparatus in the first embodiment.
Figure 9:
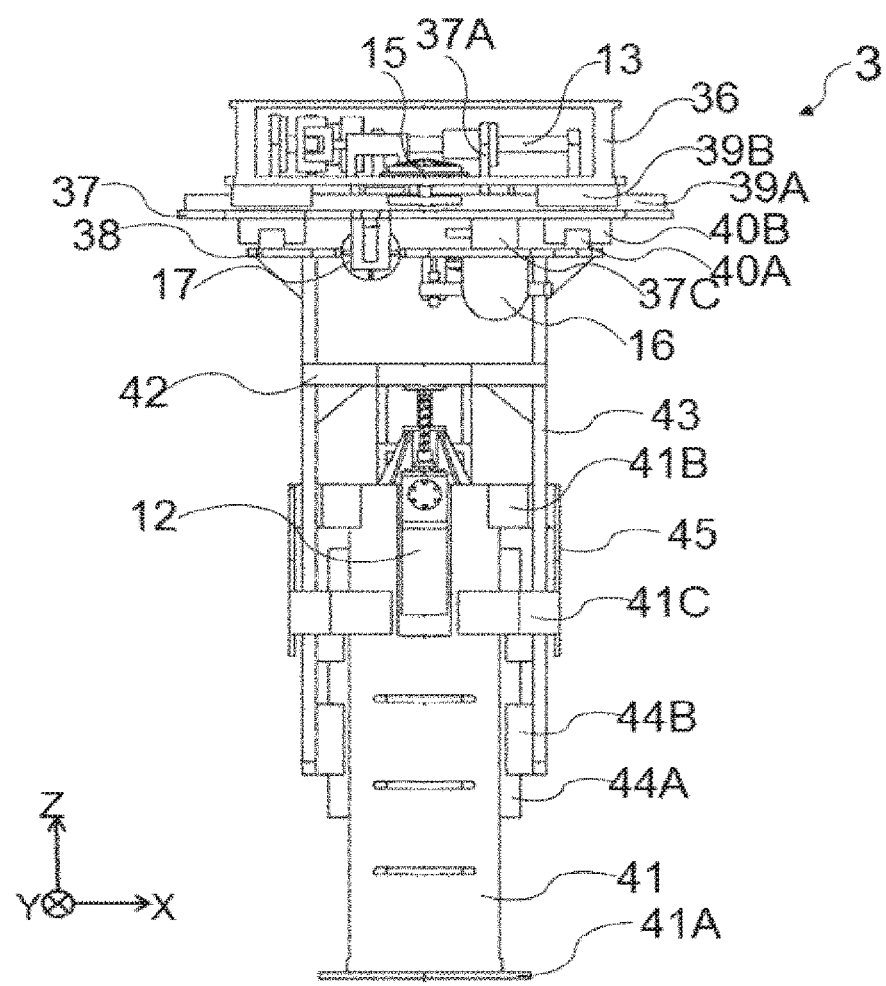
FIG. 9 is a front view of the base isolation apparatus applied under the lifting apparatus in the first embodiment.
Figure 10:
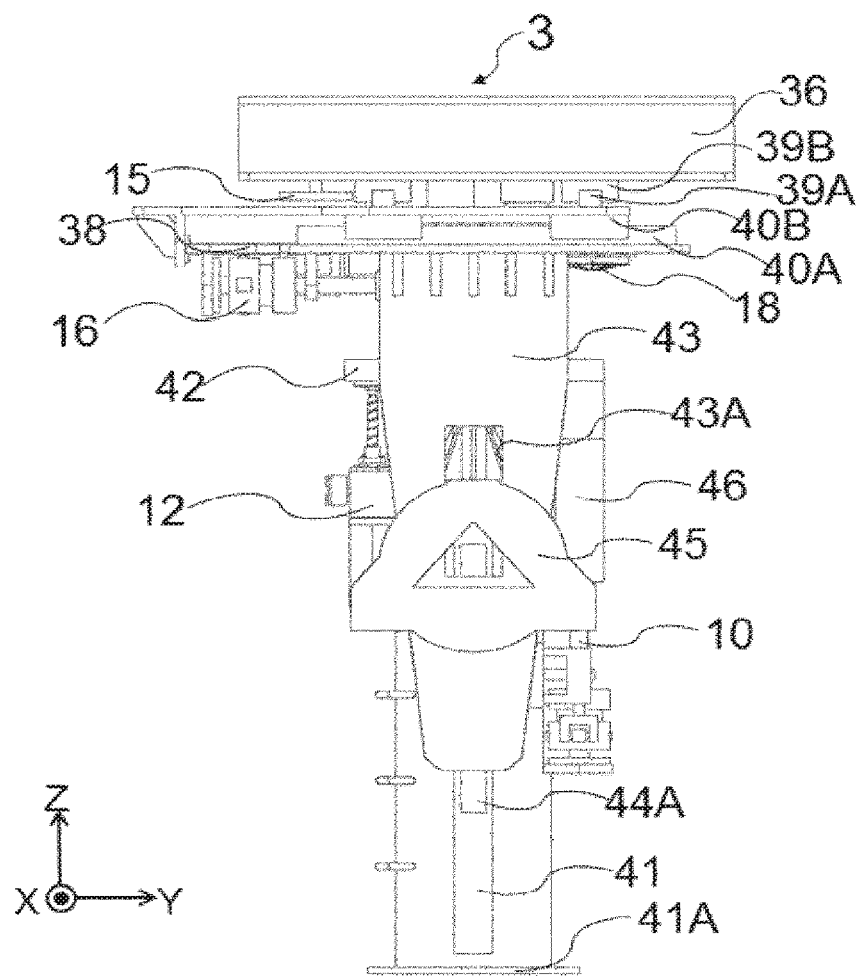
FIG. 10 is a side view of the base isolation apparatus applied under the lifting apparatus in the first embodiment.
Figure 11:
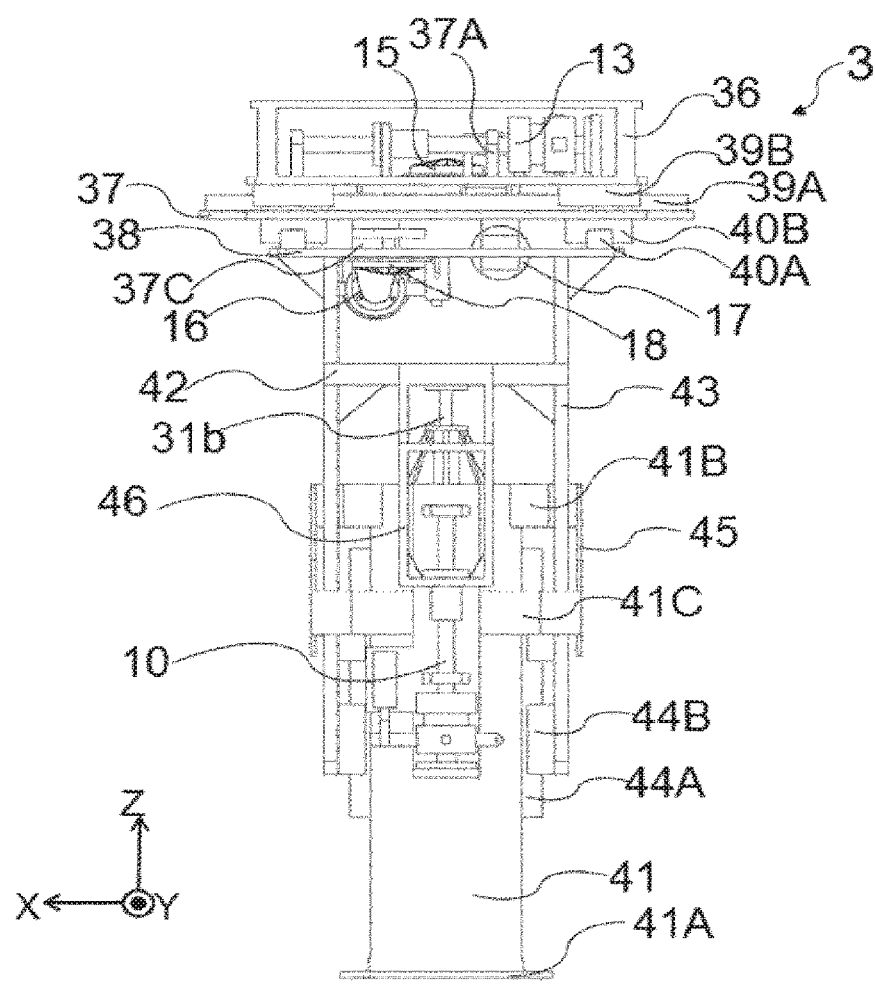
FIG. 11 is a rear view of the base isolation apparatus applied under the lifting apparatus in the first embodiment.
Figure 12:
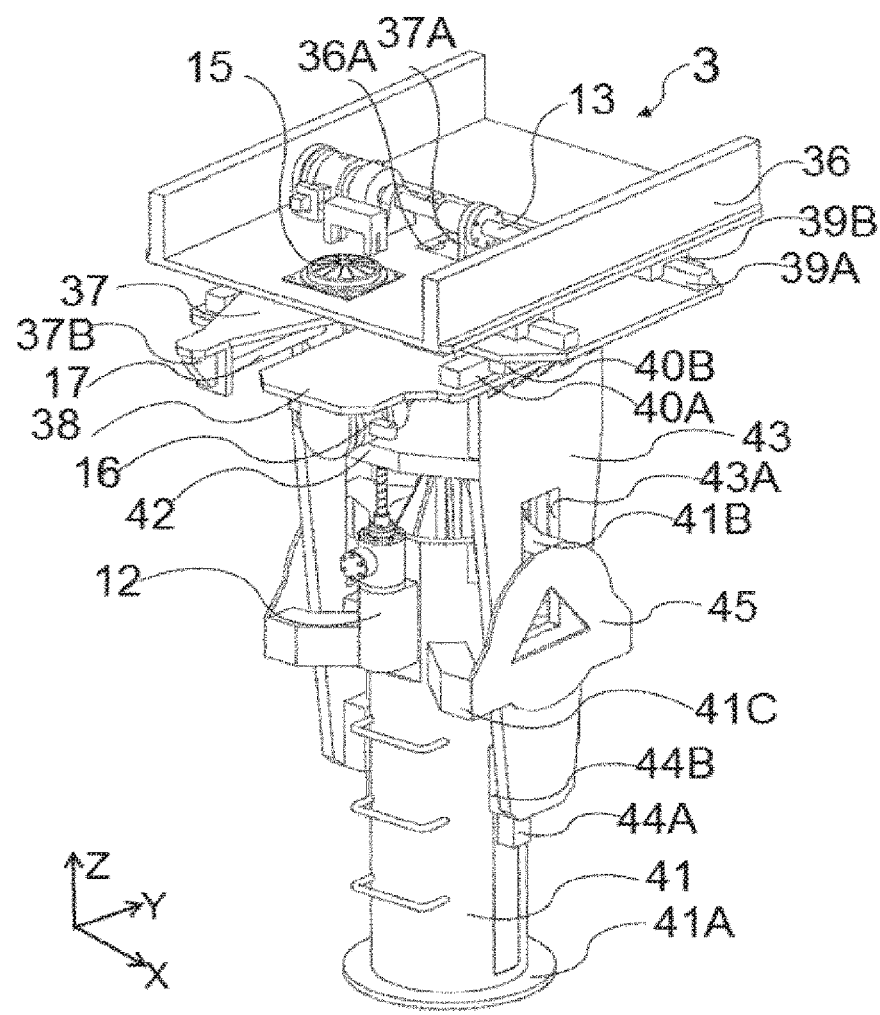
FIG. 12 is a perspective view illustrating respective structures of an X-axis lock mechanism and an X-axis damper of an X-axis base isolation unit of the base isolation apparatus applied under the lifting apparatus in the first embodiment.
Figure 13:
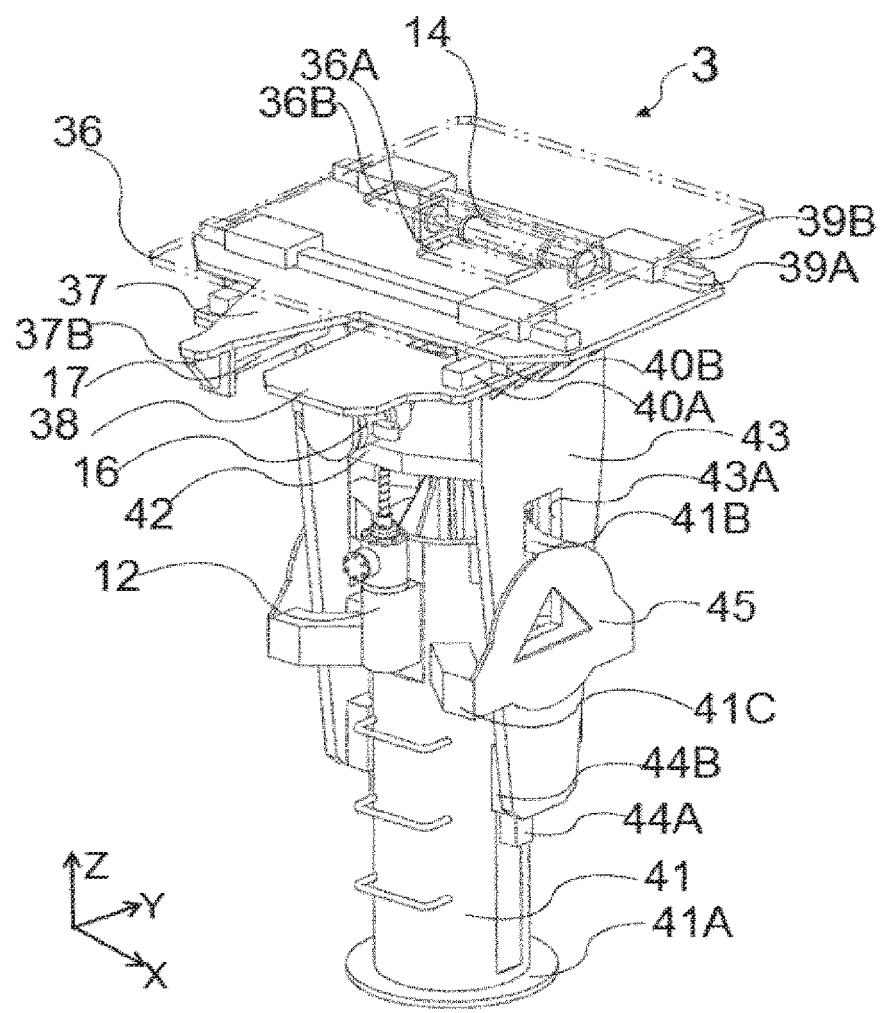
FIG. 13 is a perspective view illustrating respective structures of a guide and an X-axis spring of the X-axis base isolation unit of the base isolation apparatus applied under the lifting apparatus in the first embodiment.
Figure 14:
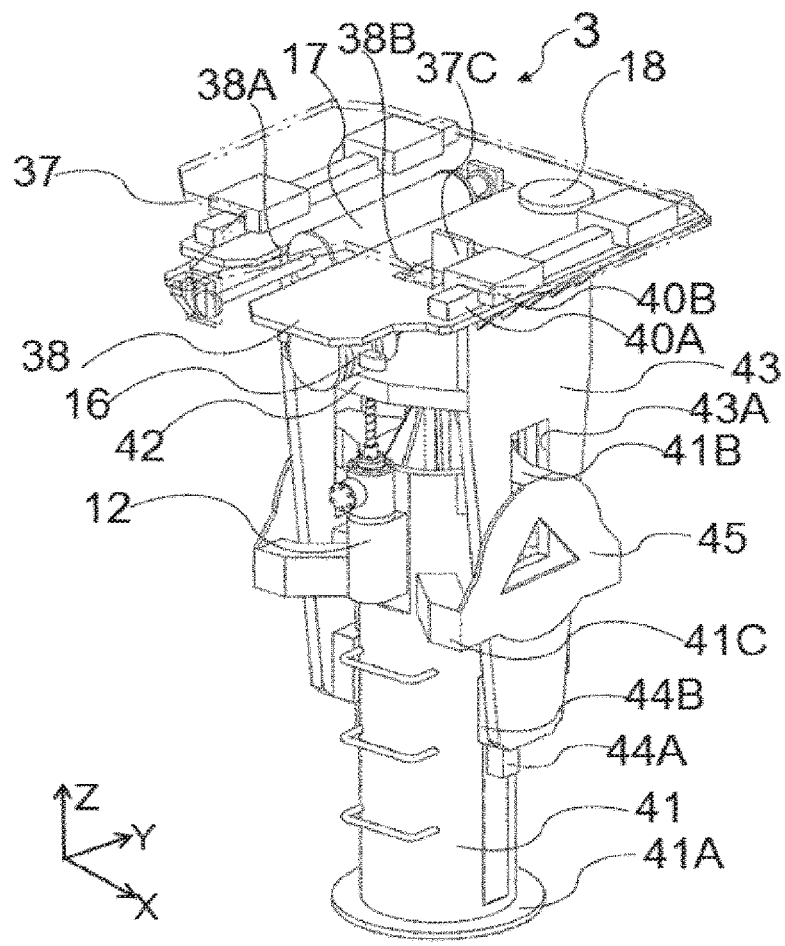
FIG. 14 is a perspective view illustrating respective structures of a guide and a Y-axis spring of a Y-axis base isolation unit of the base isolation apparatus applied under the lifting apparatus in the first embodiment.
Figure 15:
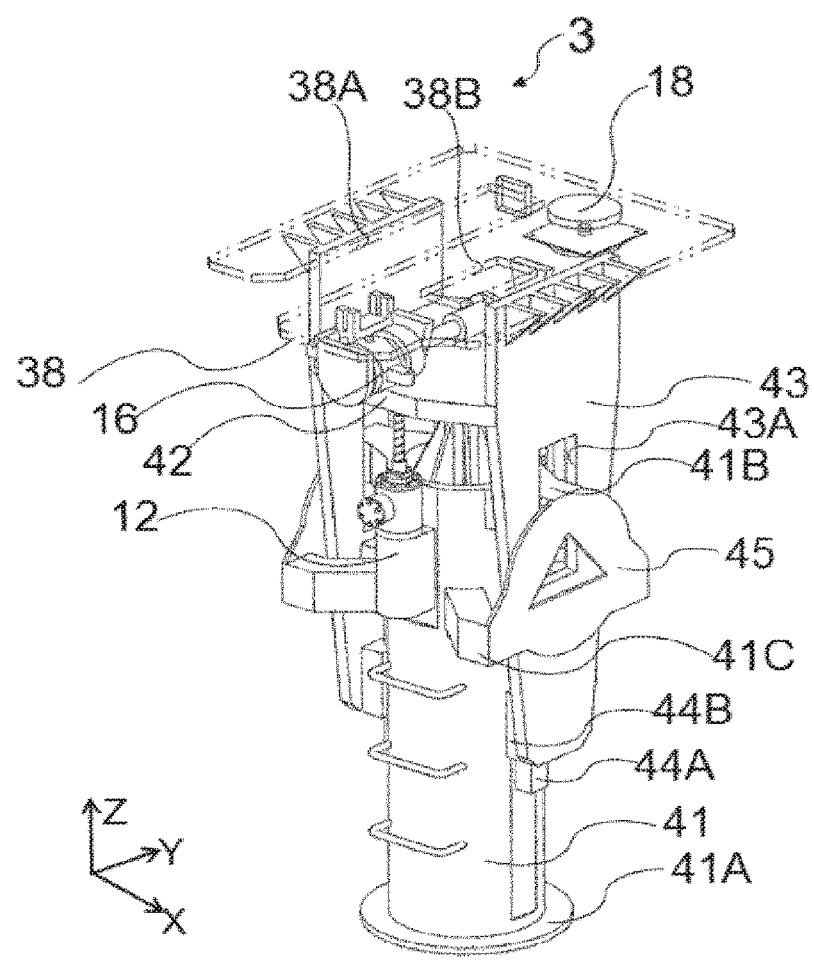
FIG. 15 is a perspective view illustrating a structure of a Y-axis lock mechanism of the Y-axis base isolation unit of the base isolation apparatus applied under the lifting apparatus in the first embodiment.
Figure 16:
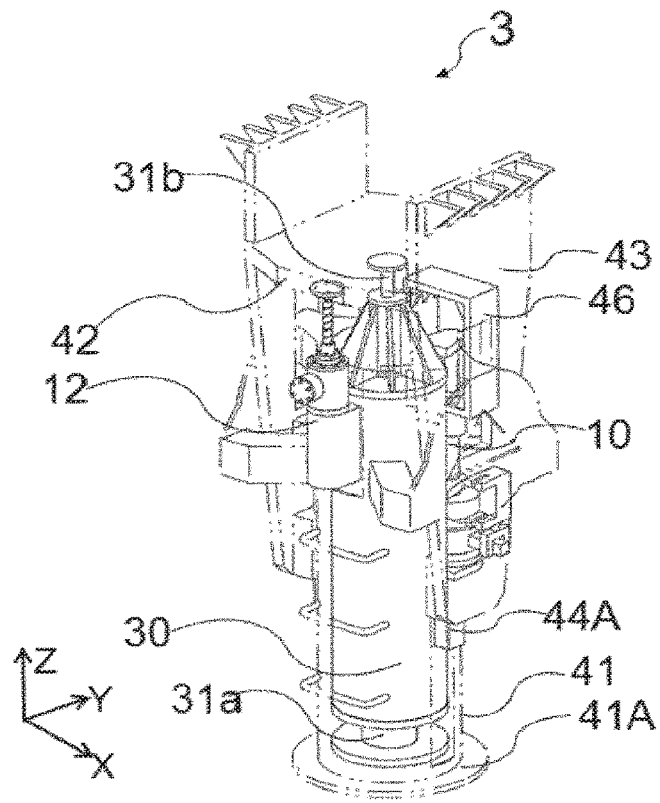
FIG. 16 is a perspective view illustrating a structure of a Z-axis base isolation unit of the base isolation apparatus applied under the lifting apparatus in the first embodiment.

With reference to FIGS. 8 to 16, a structure of base isolation apparatus 3 applied under lifting apparatus 100 is described. FIG. 8 is a perspective view, FIG. 9 is a front view, FIG. 10 is a side view, and FIG. 11 is a rear view of base isolation apparatus 3. FIGS. 12 to 16 are perspective views showing the base isolation apparatus with its upper components removed step by step. FIG. 12 is a perspective view illustrating respective structures of X-axis lock mechanism 13 and X-axis damper 15 of base isolation apparatus 3. FIG. 13 is a perspective view illustrating respective structures of a guide and X-axis spring 14 of X-axis base isolation unit 8 of base isolation apparatus 3. FIG. 14 is a perspective view illustrating respective structures of a guide and Y-axis spring 17 of Y-axis base isolation unit 9 of base isolation apparatus 3. FIG. 15 is a perspective view illustrating a structure of Y-axis lock mechanism 16 of base isolation apparatus 3. FIG. 16 is a perspective view illustrating a structure of Z-axis base isolation unit 7 of base isolation apparatus 3.

In base isolation apparatus 3, an intra-horizontal-plane base isolator 35 on which mast 1 is placed is located at an upper level, and Z-axis base isolation unit 7 is located at a lower level. In intra-horizontal-plane base isolator 35, X-axis base isolation unit 8 is located at an upper level, and Y-axis base isolation unit 9 is located at a lower level. Intra-horizontal-plane base isolator 35 includes a box 36 in a rectangular parallelepiped shape, an X-axis reference plate 37, and a Y-axis reference plate 38. Box 36 accommodates X-axis lock mechanism 13 and other components, and box 36 is mounted on X-axis reference plate 37 movably in the X-axis direction. X-axis reference plate 37 is mounted on Y-axis reference plate 38 movably in the Y-axis direction. The top surface of box 36 is connected to mast 1. Z-axis base isolation unit 7 is connected to the bottom surface of Y-axis reference plate 38. On the bottom surface of X-axis reference plate 37, Y-axis base isolation unit 9 is placed. The top surface and the bottom surface of box 36, X-axis reference plate 37, and Y-axis reference plate 38 extend horizontally.

X-axis base isolation unit 8 and Y-axis base isolation unit 9 are arranged at different levels in the top-to-bottom direction, and therefore, the area formed by projecting intra-horizontal-plane base isolator 35 on a horizontal plane is smaller and base isolation apparatus 3 can be made compact. Alternatively, Y-axis base isolation unit 9 may be located at an upper level and X-axis base isolation unit 8 may be located at a lower level. In this case, isolated-object connector 26 of X-axis base isolation unit 8 is connected to structure connector 19 of Y-axis base isolation unit 9. Z-axis base isolation unit 7 is located below X-axis base isolation unit 8 and Y-axis base isolation unit 9, and accordingly, the area formed by projecting the entire base isolation apparatus 3 on the horizontal plane is also smaller.

On the top surface of X-axis reference plate 37, two guide rails 39A are arranged in parallel with the X axis. Guide rails 39A are located close to respective sides of rectangular X-axis reference plate 37. On the lower surface of the bottom of box 36, two holders 39B per guide rail 39A are arranged at respective positions corresponding to guide rail 39A. Holder 39B holds guide rail 39A. On the top surface of rectangular Y-axis reference plate 38, guide rails 40A similar to guide rails 39A are arranged in the Y-axis direction. On the bottom surface of X-axis reference plate 37, holders 40B are arranged in the Y-axis direction. Holder 40B is similar in structure to holder 39B. Holder 39B is movable on guide rail 39A with substantially no frictional resistance. The same applies to holder 40B and guide rail 40A and to other holders and guide rails.

Guide rail 39A and holder 39B serve as a guide for guiding mast 1 to move in the X-axis direction. Guide rail 40A and holder 40B serve as a guide for guiding mast 1 and X-axis base isolation unit 8 to move in the Y-axis direction.

In box 36, X-axis lock mechanism 13 as well as the resistance generator of X-axis damper 15 are located. In the bottom of box 36, an opening 36A is formed in the X-axis direction. A protrusion 37A disposed on X-axis reference plate 37 extends through opening 36A to connect to ball screw nut 22 of X-axis lock mechanism 13. In other words, protrusion 37A on X-axis reference plate 37 is nut connector 27 of X-axis lock mechanism 13.

The resistance generator of X-axis damper 15 is fixed in box 36. The rotation converter of X-axis damper 15 is made up of a rack and a pinion located under box 36. The rack is disposed on the top surface of X-axis reference plate 37 along guide rail 39A. The pinion is disposed on the rotational shaft of X-axis damper 15. The rotational shaft of X-axis damper 15 extends through the bottom of box 36. As box 36 moves in the X-axis direction with respect to X-axis reference plate 37, the member located in the resistance generator of X-axis damper 15 rotates and thus X-axis damper 15 generates a force hindering the movement.

X-axis spring 14 is housed in an opening 36B (indicated by imaginary lines in FIG. 13) formed in the bottom of box 36. One end of X-axis spring 14 is connected to a protrusion projecting from the bottom of the box, and the other end thereof is connected to a protrusion projecting from X-axis reference plate 37.

The top surface of box 36 is isolated-object connector 26 of X-axis base isolation unit 8. X-axis reference plate 37 to which X-axis lock mechanism 13, X-axis spring 14, and the resistance generator of X-axis damper 15 are attached is structure connector 19 of X-axis base isolation unit 8.

In Y-axis reference plate 38, a long notch 38A is formed in the Y-axis direction. Y-axis spring 17 is housed in notch 38A. On X-axis reference plate 37, a protrusion 37B is formed. Protrusion 37B is formed to project from the portion of X-axis reference plate 37 extended horizontally and located above Y-axis spring 17. One end of Y-axis spring 17 is connected to protrusion 37B. The other end of Y-axis spring 17 is connected to a plate disposed at the deepest portion of notch 38A cutting into Y-axis reference plate 38 and provided perpendicularly to Y-axis reference plate 38. Y-axis lock mechanism 16 is located under Y-axis reference plate 38. An opening 38B is formed in Y-axis reference plate 38. A protrusion 37C of X-axis reference plate 37 extends through opening 38B and is connected to ball screw nut 22 of Y-axis lock mechanism 16. The resistance generator of Y-axis damper 18 is fixed to the lower side of Y-axis reference plate 38. The rotation converter of Y-axis damper 18 includes a rack and a pinion. The rack is disposed on the lower surface of X-axis reference plate 37 along holder 40B. The pinion is disposed on a rotational shaft extending through Y-axis reference plate 38. Y-axis lock mechanism 16 is located under Y-axis reference plate 38. One end of nut connector 27 of Y-axis lock mechanism 16 is connected to the lower surface of X-axis reference plate 37.

Y-axis lock mechanism 16, Y-axis spring 17, and Y-axis damper 18 include a member connecting to X-axis reference plate 37 and a member connecting to Y-axis reference plate 38. X-axis reference plate 37 is isolated-object connector 26 of Y-axis base isolation unit 9. Y-axis reference plate 38 is structure connector 19 of Y-axis base isolation unit 9.

Z-axis preloaded spring 11 is disposed in a cylinder 41 embedded in ground 71. The lower opening of cylinder 41 is closed by a bottom plate 41A. On the bottom side in cylinder 41, one end of shaft 31a of Z-axis base isolation unit 7 is connected to bottom plate 41A, and the other end thereof is connected to preloaded compressive-side spring 28a located in cylindrical casing 30. The contour of the upper portion of casing 30 is in the shape of a frustum. In the frustum portion, tensile-side spring 28b is located. One end of tensile-side shaft 31b is connected to the lower surface of a top plate 42 of Z-axis base isolation unit 7. The other end of shaft 31b is located in casing 30 between tensile-side spring 28b and partition wall 29.

Under Y-axis reference plate 38, a top plate 42 and two guide plates 43 being connected to respective two sides of top plate 42 are disposed. Guide plates 43 extend to sandwich cylinder 41 therebetween under top plate 42. Guide rails 44A are disposed on respective two sides, in the X-axis direction, of cylinder 41. On the leading end of guide plate 43, a holder 44B holding guide rail 44A is disposed. Guide rail 44A and holder 44B serve as a guide for guiding mast 1, X-axis base isolation unit 8, and Y-axis base isolation unit 9 to move in the Z-axis direction.

An opening 43A is formed in guide plate 43. A protrusion 41B disposed on cylinder 41 extends through opening 43A. Protrusions 41C, 41D are disposed on cylinder 41 so that guide plate 43 is located between these protrusions. Protrusions 41B, 41C, 41D are coupled together by a coupling plate 45.

Z-axis damper 12 is located on the front side of Z-axis preloaded spring 11. One end of Z-axis damper 12 is connected to the side surface of cylinder 41. The other end of Z-axis damper 12 is connected to top plate 42. Z-axis lock mechanism 10 is disposed on the rear side of cylinder 41 to extend in the vertical direction. A frame 46 is disposed below top plate 42. Frame 46 is connected to ball screw nut 22 of Z-axis lock mechanism 10. In other words, frame 46 is nut connector 27 of Z-axis lock mechanism 10.

Z-axis lock mechanism 10, Z-axis preloaded spring 11, and Z-axis damper 12 have a member connecting to Y-axis reference plate 38 and a member connecting to cylinder 41. Y-axis reference plate 38 is isolated-object connector 26 of Z-axis base isolation unit 7. Cylinder 41 and bottom plate 41A are structure connector 19 of Z-axis base isolation unit 7.

Figure 17:
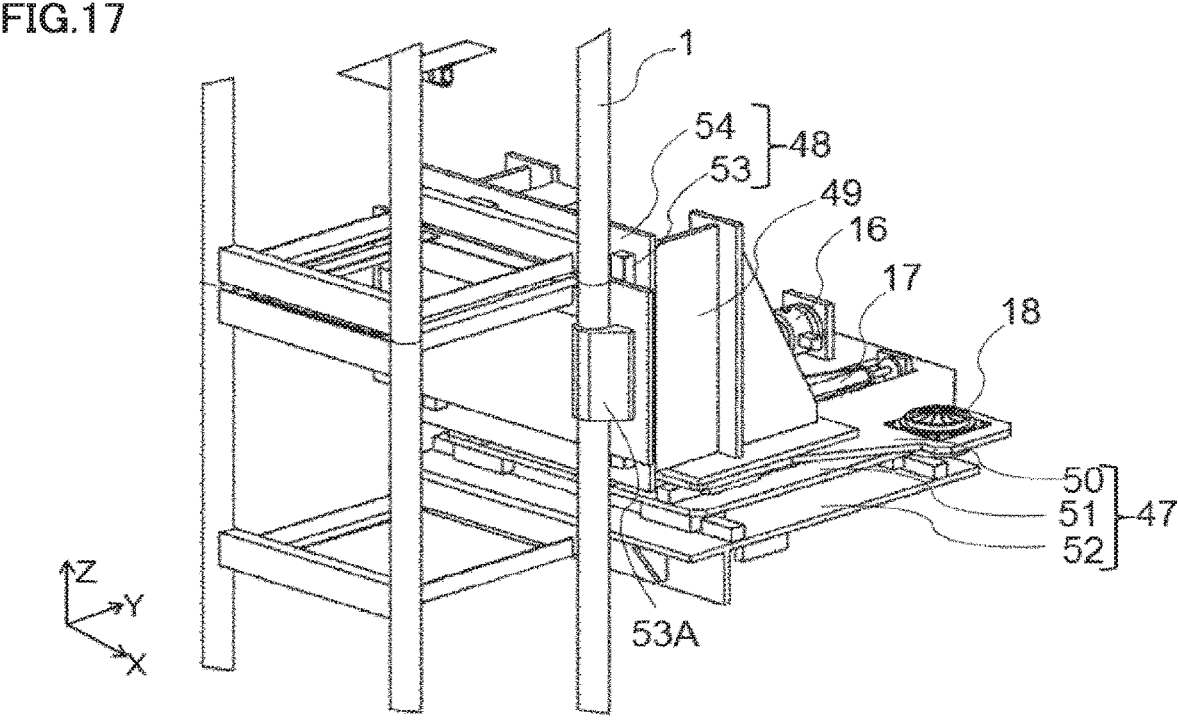
FIG. 17 is a perspective view of a base isolation apparatus applied to a place where the lifting apparatus in the first embodiment is supported by a building structure.
Figure 18:
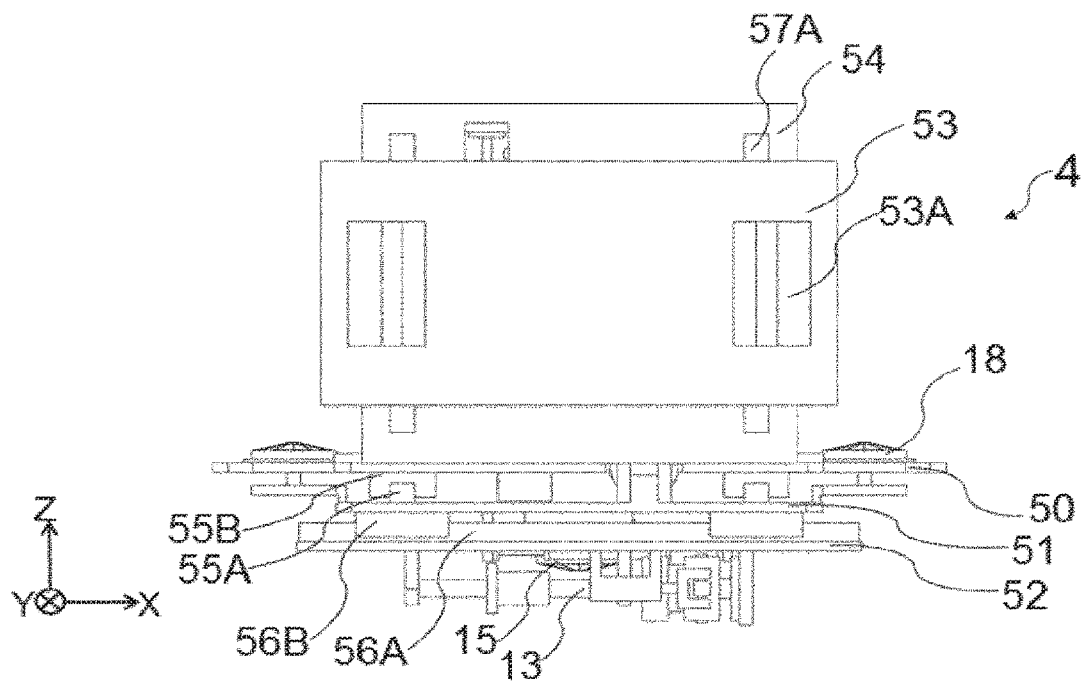
FIG. 18 is a front view of the base isolation apparatus applied to a place where the lifting apparatus in the first embodiment is supported by a building structure.
Figure 19:
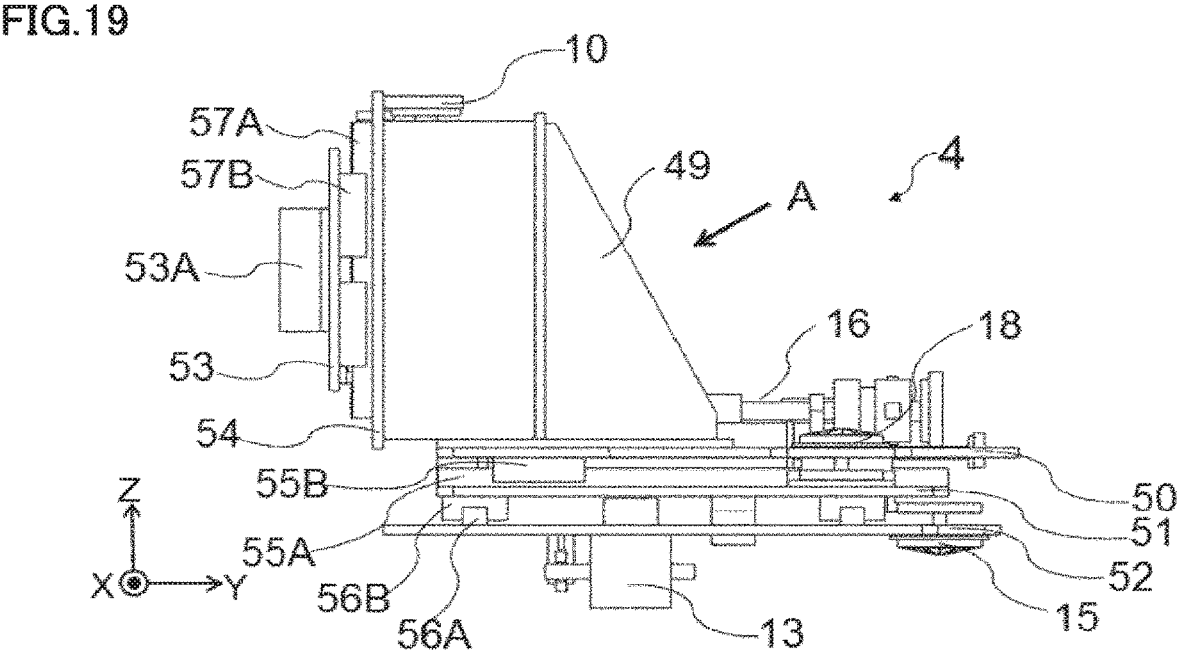
FIG. 19 is a side view of the base isolation apparatus applied to a place where the lifting apparatus in the first embodiment is supported by a building structure.
Figure 20:
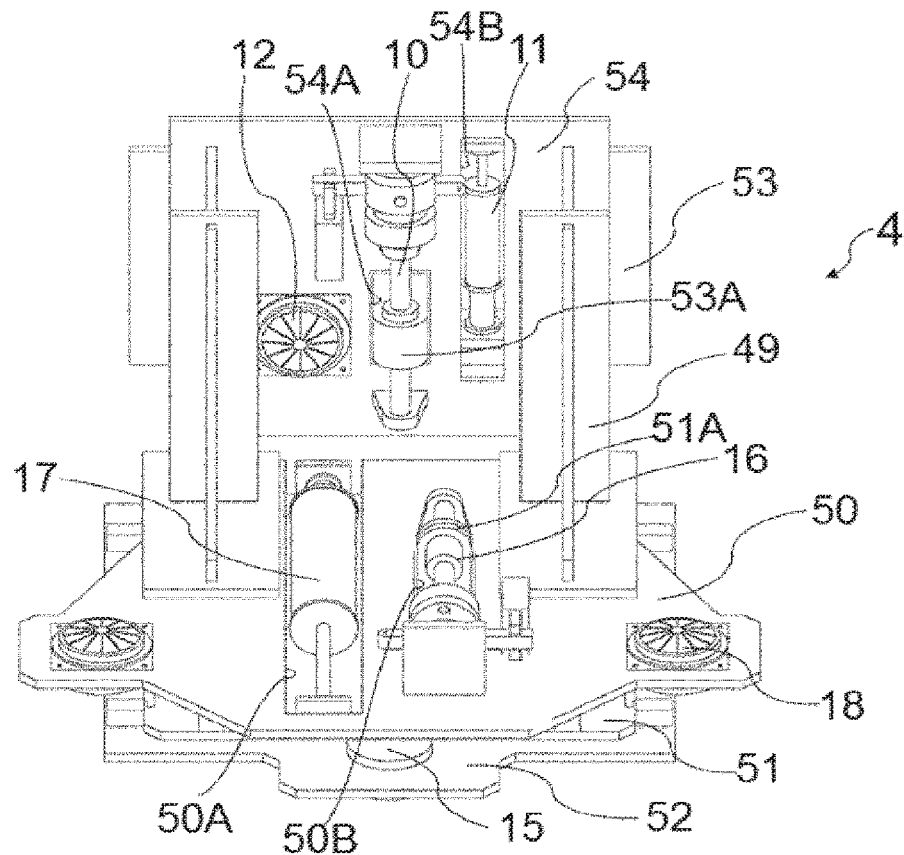
FIG. 20 shows a rear side of the base isolation apparatus, as seen from above obliquely, applied to a place where the lifting apparatus in the first embodiment is supported by a building structure.

With reference to FIGS. 17 to 20, a structure of base isolation apparatus 4 provided at a place of each floor where mast 1 is supported by building structure 70 is described. FIG. 17 is a perspective view, FIG. 18 is a front view, and FIG. 19 is a side view of base isolation apparatus 4, and FIG. 20 shows the rear side of base isolation apparatus 4 as seen from above obliquely. FIG. 20 shows base isolation apparatus 4 as seen in the direction of arrow A shown in FIG. 19.

Base isolation apparatus 4 includes an intra-horizontal-plane base isolator 47, a vertical base isolator 48, and a coupler 49. Intra-horizontal-plane base isolator 47 is connected to building structure 70. Vertical base isolator 48 is disposed along mast 1. Coupler 49 couples intra-horizontal-plane base isolator 47 and vertical base isolator 48 to each other. Intra-horizontal-plane base isolator 47 is similar in structure to intra-horizontal-plane base isolator 35. In the order from top to bottom, a Y-axis movable plate 50, a Y-axis reference plate 51, and X-axis reference plate 52 are disposed horizontally. Under intra-horizontal-plane base isolator 47, a structural member (not shown) connecting to building structure 70 is located. X-axis reference plate 52 is fixed to the structural member.

On the top surface of Y-axis reference plate 51, two guide rails 55A are arranged in parallel with the Y axis. Guide rails 55A are located close to respective sides of rectangular Y-axis reference plate 51. On the lower surface of Y-axis movable plate 50, two holders 55B per guide rail 55A are arranged at respective positions corresponding to guide rail 55A. Holder 55B holds guide rail 55A. On the top surface of rectangular X-axis reference plate 52, guide rails 56A are arranged in the X-axis direction. Guide rail 56A is similar in structure to guide rail 55A. On the bottom surface of Y-axis reference plate 51, holders 56B are arranged in the X-axis direction. Holder 56B is similar in structure to holder 55B.

Guide rail 55A and holder 55B serve as a guide for guiding mast 1 and Z-axis base isolation unit 7 to move in the Y-axis direction. Guide rail 56A and holder 56B serve as a guide for guiding mast 1, Z-axis base isolation unit 7, and Y-axis base isolation unit 9 to move in the X-axis direction.

As shown in FIG. 20, the resistance generator of Y-axis damper 18 and Y-axis lock mechanism 16 are located on the upper side of Y-axis movable plate 50. In Y-axis movable plate 50, an opening 50B being longer in the Y-axis direction is formed at a position above which Y-axis lock mechanism 16 is located. On Y-axis reference plate 51, a protrusion 51A is disposed to extend through opening 50B. Protrusion 51A is connected to ball screw nut 22 of Y-axis lock mechanism 16. Y-axis spring 17 is housed in an opening 50A formed in Y-axis movable plate 50. One end of Y-axis spring 17 is connected to a plate disposed on a side surface of opening 50A. One end of Y-axis spring 17 is connected to a protrusion protruding upward from Y-axis reference plate 51. The rotation converter of Y-axis damper 18 is made up of a rack disposed on the top surface of Y-axis reference plate 51 along guide rail 55A, and a pinion mounted on a rotational shaft extending through Y-axis movable plate 50.

Y-axis lock mechanism 16, Y-axis spring 17, and Y-axis damper 18 include a member connecting to Y-axis movable plate 50 and a member connecting to Y-axis reference plate 51. Y-axis movable plate 50 is isolated-object connector 26 of Y-axis base isolation unit 9. Y-axis reference plate 51 is structure connector 19 of Y-axis base isolation unit 9.

On the lower side of X-axis reference plate 52, X-axis lock mechanism 13 is disposed. In X-axis reference plate 52, an opening is formed to extend in a range under which ball screw nut 22 of X-axis lock mechanism 13 moves. A protrusion extending from the lower side of Y-axis reference plate 51 and passing through this opening protrudes to connect to ball screw nut 22. X-axis spring 14 is housed in an opening formed in X-axis reference plate 52. One end of X-axis spring 14 is connected to X-axis reference plate 52, and the other end thereof is connected to Y-axis reference plate 51. The resistance generator of X-axis damper 15 is fixed to the lower side of X-axis reference plate 52. The rotation converter of X-axis damper 15 is made up of a rack disposed on the lower surface of Y-axis reference plate 51 along holder 56B, and a pinion disposed on a rotational shaft extending through X-axis reference plate 52.

X-axis lock mechanism 13, X-axis spring 14, and X-axis damper 15 include a member connecting to Y-axis reference plate 51 and a member connecting to X-axis reference plate 52. Y-axis reference plate 51 is isolated-object connector 26 of X-axis base isolation unit 8. X-axis reference plate 52 is structure connector 19 of X-axis base isolation unit 8.

Vertical base isolator 48 includes a Z-axis reference plate 53 attached to mast 1 and disposed in the vertical direction, and a Z-axis movable plate 54 movable in the Z-axis direction with respect to Z-axis reference plate 53. Z-axis movable plate 54 has a surface facing mast 1, and a guide rail 57A is disposed on this surface. On Z-axis reference plate 53, a holder 57B holding guide rail 57A is disposed. Guide rail 57A and holder 57B serve as a guide for guiding Z-axis base isolation unit 7 to move in the Z-axis direction with respect to mast 1. Z-axis base isolation unit 7 is located along mast 1.

Z-axis movable plate 54 has a surface located further from mast 1 and, on this surface, Z-axis lock mechanism 10 and the resistance generator of Z-axis damper 12 are disposed. In Z-axis movable plate 54, an opening 54A is formed. A protrusion 53A disposed on Z-axis reference plate 53 passes through opening 54A and is connected to ball screw nut 22 of Z-axis lock mechanism 10. Z-axis preloaded spring 11 is housed in an opening 54B formed in Z-axis movable plate 54. One end of Z-axis preloaded spring 11 is connected to a plate disposed on the upper side of opening 54B. The other end of Z-axis preloaded spring 11 is connected to a protrusion disposed on Z-axis reference plate 53. Z-axis reference plate 53 has a surface located further from mast 1, and a rack of the rotational converter of Z-axis damper 12 is disposed on this surface along holder 57B. A pinion thereof is disposed on a rotational shaft extending through Z-axis movable plate 54.

Coupler 49 couples Z-axis movable plate 54 and Y-axis movable plate 50 to each other. Two couplers 49 are disposed at respective positions close to the sides, in the X-axis direction, of Z-axis movable plate 54 and Y-axis movable plate 50. The shape of coupler 49 is a combination of a plate member having a trapezoidal shape as seen in the X-axis direction and vertical reinforcement plates disposed on both sides of the plate member in the X-axis direction. Coupler 49 is made up of a rectangular portion extending from the reinforcement plates toward Z-axis movable plate 54 and a triangular portion extending on the contrary side from the reinforcement plates.

Z-axis lock mechanism 10, Z-axis preloaded spring 11, and Z-axis damper 12 include a member connecting to Z-axis reference plate 53 and a member connecting to Z-axis movable plate 54. Z-axis reference plate 53 is isolated-object connector 26 of Z-axis base isolation unit 7. Z-axis movable plate 54 is structure connector 19 of Z-axis base isolation unit 7.

Figure 21:
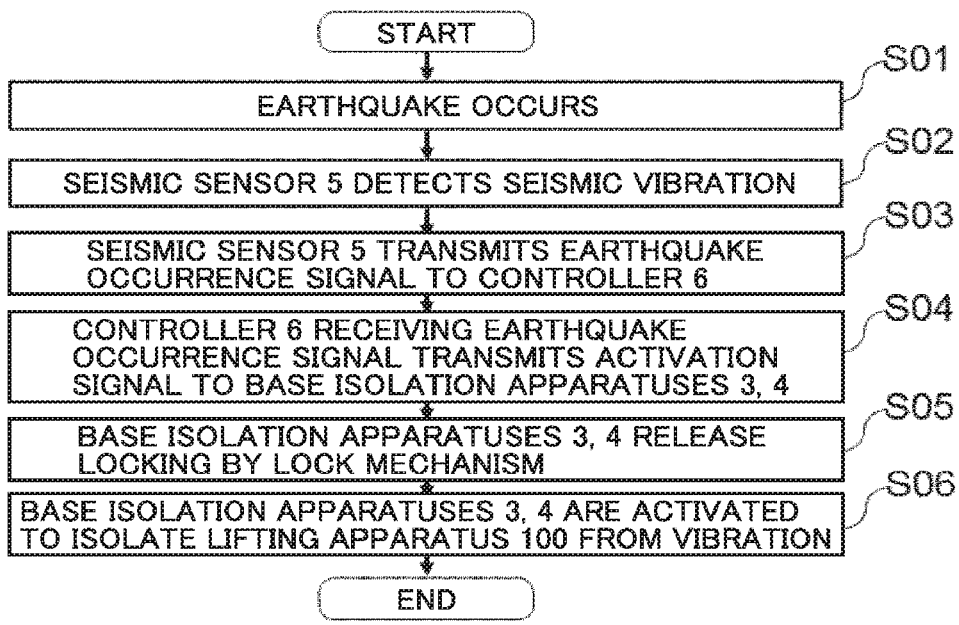
FIG. 21 is a flowchart illustrating an example in which a base isolation apparatus applied to the lifting apparatus in the first embodiment is activated.

Operation is described. FIG. 21 is a flowchart illustrating an example in which the base isolation apparatus is activated. The operation illustrated in FIG. 21 is performed in the event of an earthquake occurring near the location where lifting apparatus 100 is installed. In FIG. 21, the operation from occurrence of an earthquake to activation of the base isolation apparatus is illustrated. In step S01, an earthquake occurs. In step S02, seismic sensor 5 detects seismic vibration, i.e., an acceleration larger than a threshold value. In step S03, seismic sensor 5 transmits an earthquake occurrence signal to controller 6. In step S04, controller 6 receiving the earthquake occurrence signal transmits an activation signal to base isolation apparatuses 3, 4. In step S05, base isolation apparatuses 3, 4 release locking by the lock mechanism. In step S06, base isolation apparatuses 3, 4 are activated to isolate lifting apparatus 100 from vibration.

Figure 22:
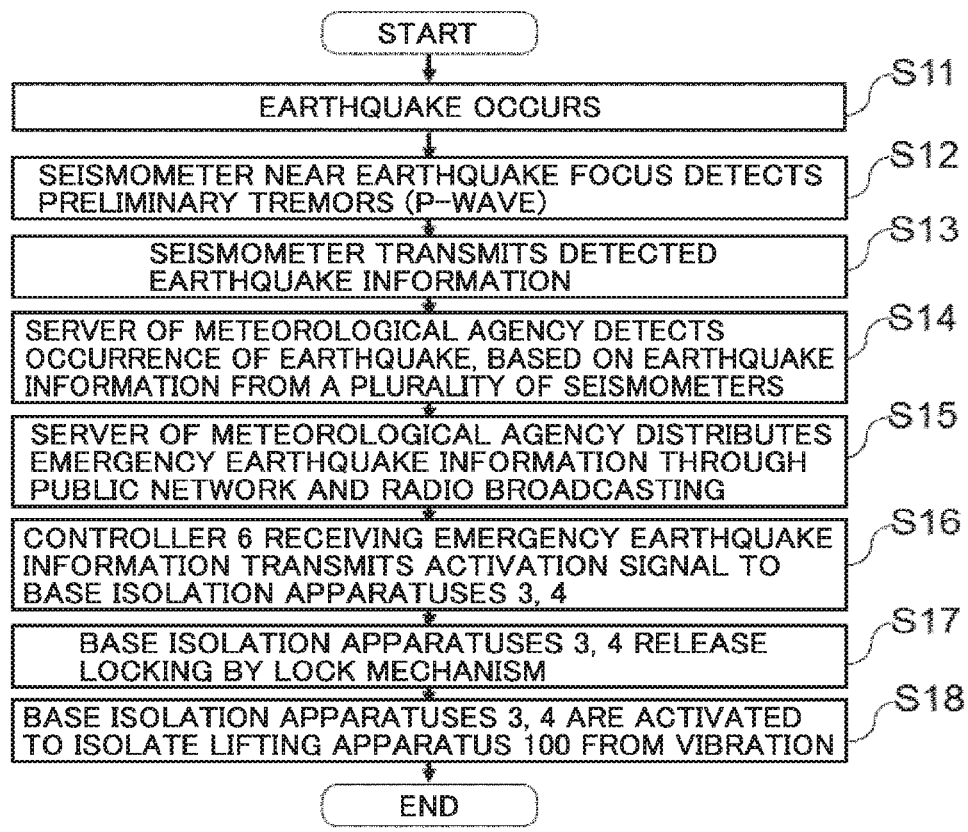
FIG. 22 is a flowchart illustrating another example in which a base isolation apparatus applied to the lifting apparatus in the first embodiment is activated.

FIG. 22 is a flowchart illustrating another example in which the base isolation apparatus is activated. The operation illustrated in FIG. 22 is performed in the event of a large earthquake occurring at a location remote from the location where lifting apparatus 100 is installed. In step S11, an earthquake occurs. In step S12, a seismometer near the earthquake focus detects preliminary tremors (P-wave). In step S13, the seismometer transmits the detected earthquake information. In step S14, a server of a meteorological agency detects occurrence of an earthquake, based on earthquake information transmitted from a plurality of seismometers. In step S15, the server of the meteorological agency distributes emergency earthquake information through a public network and radio broadcasting. In step S16, controller 6 receiving the emergency earthquake information transmits an activation signal to base isolation apparatuses 3, 4. In step S17, base isolation apparatuses 3, 4 release locking by the lock mechanism. In step S18, base isolation apparatuses 3, 4 are activated to isolate lifting apparatus 100 from vibration.

In countries other than Japan, the operation is performed similarly in response to receiving distributed information similar to the emergency earthquake information.

When base isolation apparatus 3, 4 releases locking by the lock mechanism, a load is applied to Z-axis preloaded spring 11 of base isolation apparatus 3, 4. The applied load is due to gravity acting on mast 1. To Z-axis preloaded spring 11 of Z-axis base isolation unit 7, a pressure of the same magnitude as the load due to gravity acting on mast 1 is applied in advance. Therefore, Z-axis preloaded spring 11 is not stretched or compressed when the load is applied.

When base isolation apparatuses 3, 4 are activated, vibration from building structure 70 or ground 71 is transmitted through the springs and dampers to mast 1. Because the vibration is transmitted through the springs and dampers, a large acceleration at which building structure 70 or ground 71 vibrates is reduced and the reduced acceleration is transmitted to mast 1. It is accordingly possible to reduce the possibility that mast 1 is damaged due to the earthquake.

When the earthquake ends, the springs of base isolation apparatus 3, 4 cause base isolation apparatus 3, 4 to return to the original position locked by lock mechanism. It is therefore unnecessary to make positional adjustments after the earthquake. The lock mechanism is returned manually or automatically into the locked state.

Lifting apparatus 100 is a structure that can be supported at limited locations of the structure. Base isolation apparatuses 3, 4 can also isolate such a structure from vibration in the top-to-bottom direction in which the load is applied. The structure may also be a roof covering a stadium for sports such as baseball or football, a roof covering a concourse of a station, and the like.

While no earthquake occurs, the lock mechanism of the base isolation apparatus works and the object to be isolated from vibration, such as lifting apparatus, is secured firmly to the building structure. When a large external force is exerted on the mast of the lifting apparatus, the mast can still be secured with a high rigidity and the shape that can support the mast can be maintained.

The lower limit of the acceleration at which locking by the lock mechanism is released may be determined, and the determined lower limit may be used for releasing locking by the lock mechanism when a device configured to detect the acceleration detects an acceleration of more than or equal to the lower limit. In this way, for base isolation apparatuses 3, 4, the threshold value for the acceleration at which the lock mechanism releases locking can be kept constant, regardless of the weight of a person or object carried on the cage.

When base isolation apparatuses 3, 4 are activated, electric power is used for releasing locking by the lock mechanism, while no electric power is required during the operation of isolating the object from vibration. For activating the lock mechanism, electric power from a capacitor or the like, for example, disposed near the lock mechanism may be used. Then, locking by the lock mechanism can still be released during power failure. When power failure occurs while a command to release locking is not received from the controller, the lock mechanism of the base isolation apparatus may release locking.

The load direction may be a direction in which the load is applied, and is not limited to the vertical direction. The load-direction base isolation unit may be any as long as the compressive-side elastic body is preloaded. The X-axis base isolation unit and the Y-axis base isolation unit in which the preloaded spring is not used may be different from those in the present embodiment. The X-axis base isolation unit and the Y-axis base isolation unit may be any as long as they can isolate an object from vibration in the base isolation direction.

The base isolation unit for isolating an object from vibration in the direction in which the load is applied may be a base isolation unit including: a lock device switching between a state of fixing the distance between the vibration source and the object to be isolated from vibration, and a state of making the object movable; a distance recovery device having a preloaded compressive-side elastic body for generating a force to cause the amount of change in the distance to approach zero; and a vibration damper for reducing the change in distance. The lock device, the distance recovery device, and the vibration damper are arranged in parallel. The base isolation apparatus according to the present disclosure uses such a base isolation unit as a load-direction base isolation unit for base isolation in the load direction which crosses the horizontal plane and in which the load is applied, and includes a first-direction base isolation unit and a second-direction base isolation unit for base isolation in a first direction and a second direction, respectively. The first direction and the second direction are two different directions in the horizontal plane. When the load is applied to one or both of the first-direction base isolation unit and the second-direction base isolation unit, a base isolation unit including the distance recovery device having the preloaded compressive-side elastic body is used for the one or both of the first-direction base isolation unit and the second-direction base isolation unit to which the load is applied.

The foregoing applies as well to other embodiments.

Second Embodiment

Figure 23:
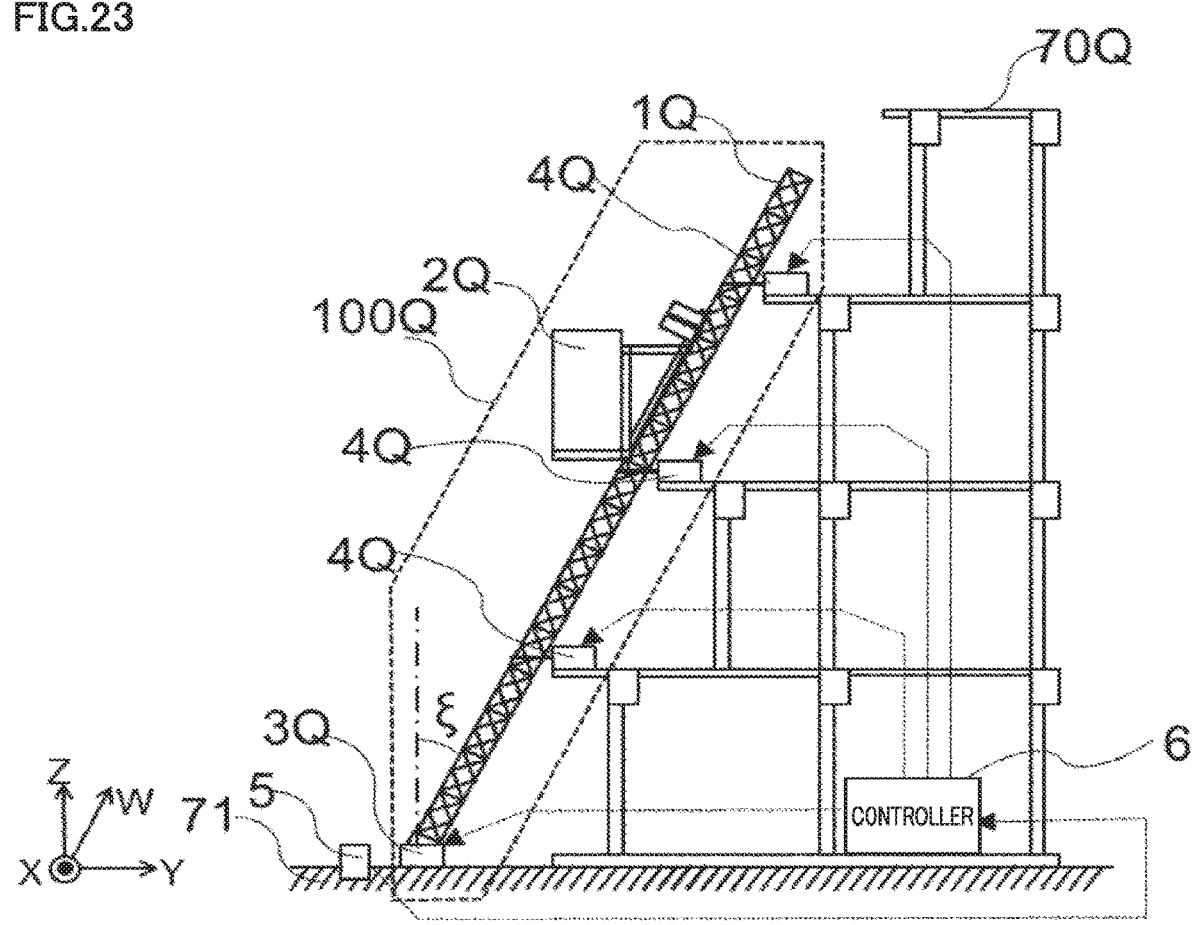
FIG. 23 illustrates a configuration of a lifting apparatus in a second embodiment of the present disclosure.

A second embodiment is directed to base isolation for a lifting apparatus in which a mast is disposed obliquely. FIG. 23 illustrates a configuration of a lifting apparatus in the second embodiment of the present disclosure. Lifting apparatus 100Q is a lifting apparatus in which a cage 2Q is moved along a mast 1Q disposed obliquely for a four-floor building structure 70Q, for example. A base isolation apparatus 3Q is disposed between mast 1Q and ground 71, and a base isolation apparatus 4Q is disposed at a place of each floor where mast 1Q is supported by building structure 70Q.

Figure 24:
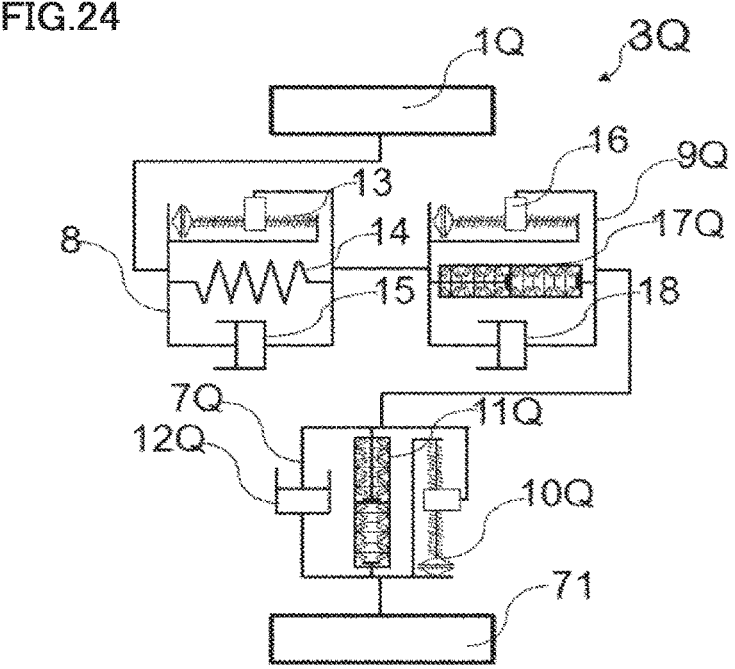
FIG. 24 is a schematic configuration diagram of a base isolation apparatus applied under the lifting apparatus in the second embodiment.

As shown in FIG. 23, mast 1Q is inclined at angle $\xi$ with respect to the vertical direction (Z-axis direction). The direction in which mast 1Q extends is referred to herein as load direction (W-axis direction). The W-axis direction projected on a horizontal plane is defined herein as Y-axis direction. FIG. 24 is a schematic configuration diagram of base isolation apparatus 3Q applied under the lifting apparatus. Base isolation apparatus 3Q includes a W-axis base isolation unit 7Q, a Y-axis base isolation unit 9Q, and an X-axis base isolation unit 8. W-axis base isolation unit 7Q isolates mast 1Q (object to be isolated from vibration) from vibration of ground 71 in the load direction (W-axis direction). Y-axis base isolation unit 9Q isolates mast 1Q from vibration in the Y-axis direction (second direction) in a horizontal plane. X-axis base isolation unit 8 isolates mast 1Q from vibration in the X-axis direction (first direction) orthogonal to the Y-axis direction (second direction) in the horizontal plane.

W-axis base isolation unit 7Q differs from Z-axis base isolation unit 7 in the first embodiment in that the base isolation direction of the former is the W-axis direction. In other respects, W-axis base isolation unit 7Q is similar in configuration to Z-axis base isolation unit 7. W-axis base isolation unit 7Q includes a W-axis lock mechanism 10Q, a W-axis preloaded spring 11Q, and a W-axis damper 12Q.

Because W-axis base isolation unit 7Q supports mast 1Q in the W-axis direction which is not the vertical direction, a load is also applied from mast 1Q to Y-axis base isolation unit 9Q. Y-axis base isolation unit 9Q therefore includes a Y-axis preloaded spring 17Q. In Y-axis preloaded spring 17Q, the compressive-side spring to which the load is applied from mast 1Q is preloaded. In other respects, Y-axis base isolation unit 9Q is similar to Y-axis base isolation unit 9.

The configuration of X-axis base isolation unit 8 is identical to that in the first embodiment.

In base isolation apparatus 3Q, the supporting relations between W-axis base isolation unit 7Q, Y-axis base isolation unit 9Q, and X-axis base isolation unit 8, specifically how these units support other units and are supported by other units, are similar to the supporting relations between Z-axis base isolation unit 7, Y-axis base isolation unit 9, and X-axis base isolation unit 8 in base isolation apparatus 3.

Figure 25:
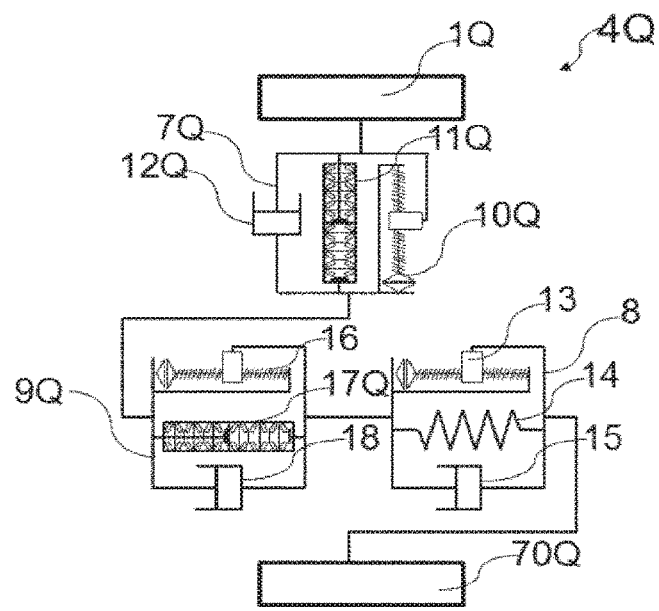
FIG. 25 is a schematic configuration diagram of a base isolation apparatus applied to a place where the lifting apparatus in the second embodiment is supported by a building structure.

FIG. 25 is a schematic configuration apparatus of base isolation apparatus 4Q applied to a place where mast 1Q is supported by building structure 70Q. Like base isolation apparatus 3Q, base isolation apparatus 4Q includes a W-axis base isolation unit 7Q, an X-axis base isolation unit 8, and a Y-axis base isolation unit 9Q. In base isolation apparatus 4Q, the supporting relations between W-axis base isolation unit 7Q, X-axis base isolation unit 8, and Y-axis base isolation unit 9Q, specifically how these units support other units and are supported by other units, are similar to the supporting relations between Z-axis base isolation unit 7, X-axis base isolation unit 8, and Y-axis base isolation unit 9 in base isolation apparatus 4.

Figure 26:
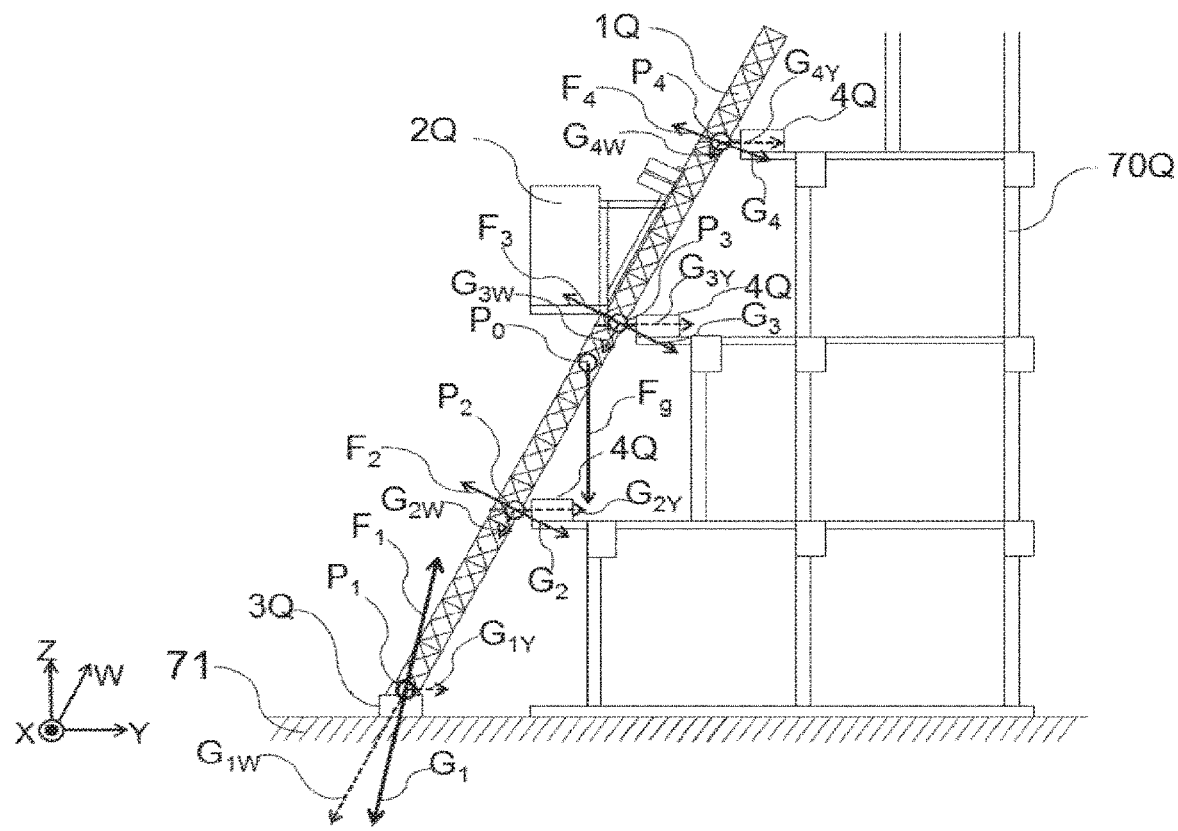
FIG. 26 illustrates the magnitude of a preload applied to a preloaded spring of each base isolation apparatus applied to the lifting apparatus in the second embodiment.

Referring to FIG. 26, the magnitude of the preload (preload value) applied to W-axis preloaded spring 11Q and Y-axis preloaded spring 17Q is described. FIG. 26 illustrates the magnitude of the preload applied to the preloaded spring in each of base isolation apparatuses 3Q, 4Q. An analysis is conducted here, based on a supposition that the combination of mast 1Q and cage 2Q is a single rigid body. Gravity $F_g$ acts on center of gravity $P_0$ of mast 1Q and cage 2Q. At point $P_1$ where base isolation apparatus 3Q supports mast 1Q, force $F_1$ is applied from base isolation apparatus 3Q to mast 1Q. At points $P_2$, $P_3$, and $P_4$ where base isolation apparatuses 4Q support mast 1Q on the second, third, and fourth floors of building structure 70Q, forces $F_2$, $F_3$, and $F_4$ act on mast 1Q, respectively.

While mast 1Q is stationary, the resultant of the gravity acting on mast 1Q and respective forces applied from base isolation apparatuses 3Q, 4Q to mast 1Q is zero, and the rotation moment about barycenter $P_0$ is zero. In further consideration of other relational expressions, forces $F_1$, $F_2$, $F_3$, and $F_4$ applied from base isolation apparatuses 3Q, 4Q to mast 1Q can be determined. Under the law of action and reaction, the forces (loads) $G_1$, $G_2$, $G_3$, and $G_4$ applied from mast 1Q to base isolation apparatuses 3Q, 4Q are $G_1=-F_1$, $G_2=-F_2$, $G_3=-F_3$, and $G_4=-F_4$.

Load $G_1$ applied to base isolation apparatus 3Q is decomposed into load $G_{1W}$ in the W-axis direction (load direction) and load $G_{1Y}$ in the Y-axis direction (second direction). The preload value of W-axis preloaded spring 11Q of base isolation apparatus 3Q is set to $|G_{1W}|$, and the preload value of Y-axis preloaded spring 17Q thereof is set to $|G_{1Y}|$. For base isolation apparatus 4Q mounted on the second floor of building structure 70Q as well, load $G_2$ applied to base isolation apparatus 4Q is decomposed into load $G_{2W}$ in the W-axis direction and load $G_{2Y}$ in the Y-axis direction. The preload value of W-axis preloaded spring 11Q of base isolation apparatus 4Q mounted on the second floor of building structure 70Q is $|G_{2W}|$, and the preload value of Y-axis preloaded spring 17Q thereof is $|G_{2Y}|$. For respective base isolation apparatuses 4Q mounted on the third and fourth floors of building structure 70Q, the preload value is set similarly. The preload value of each base isolation unit may not be identical exactly to the component of load G in the base isolation direction of the base isolation unit, as long as the difference between the component of load G and the preload value exists within a predetermined range, where the component of load G in the base isolation direction of the base isolation unit is determined by decomposing load G into the component in the load direction and the component in the base isolation direction of each base isolation unit.

Figure 27:
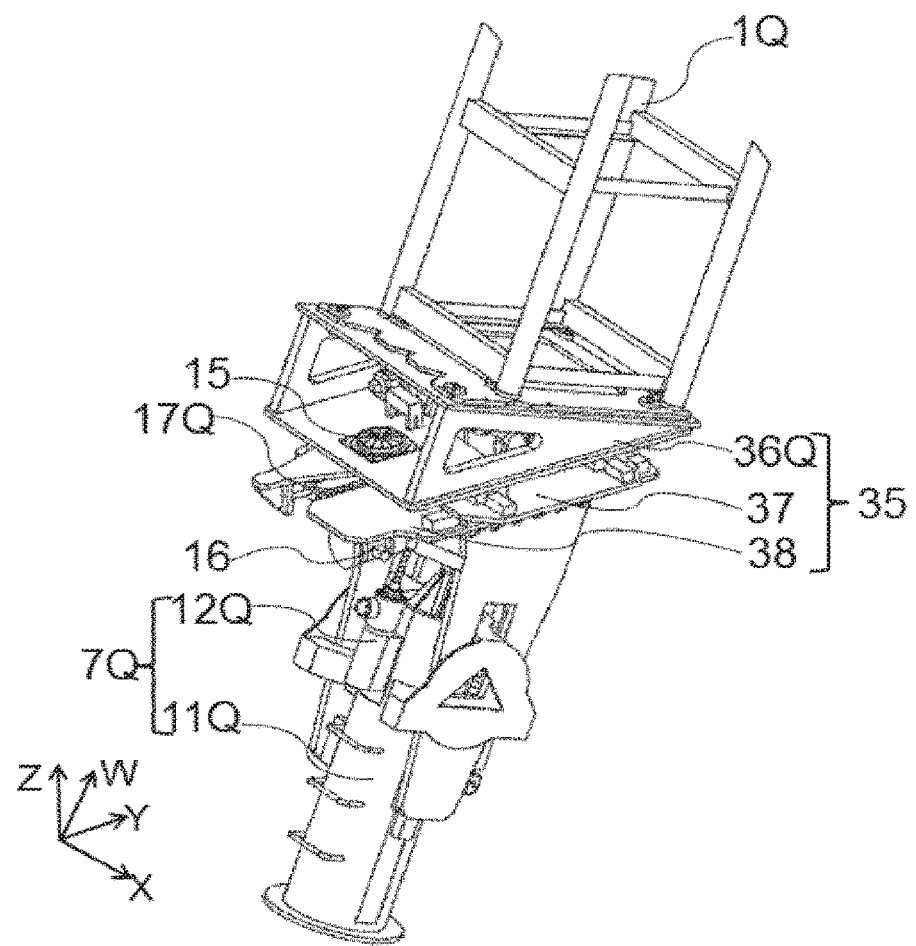
FIG. 27 is a perspective view of the base isolation apparatus applied under the lifting apparatus in the second embodiment.
Figure 28:
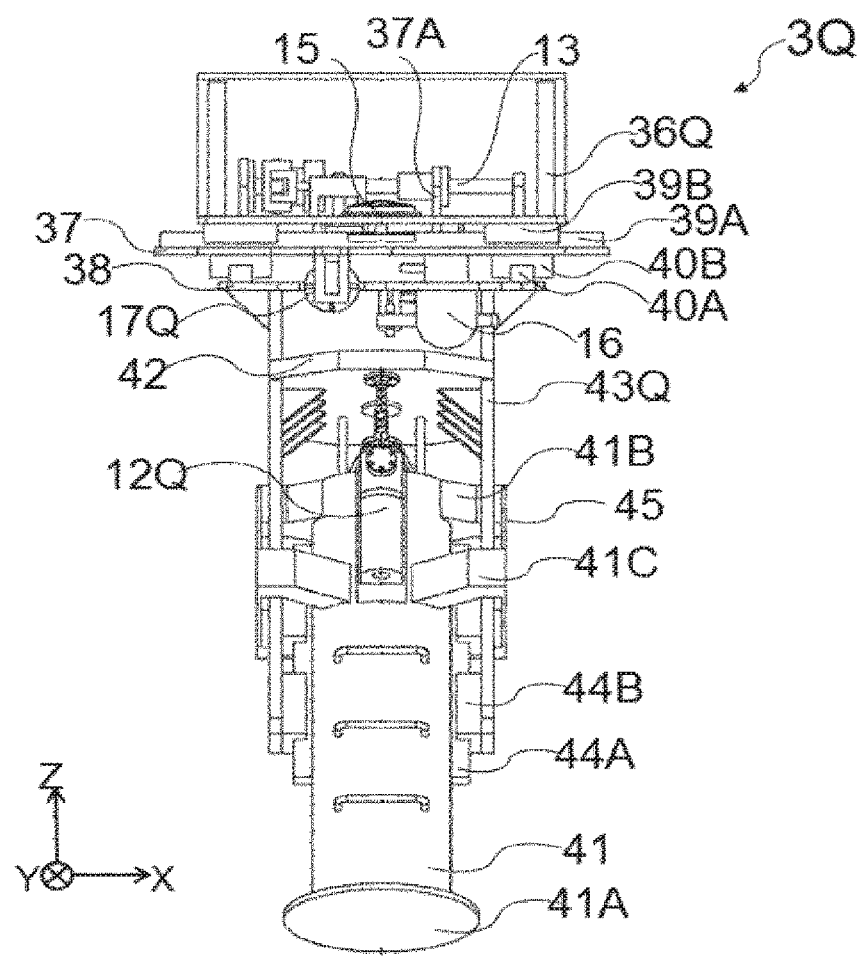
FIG. 28 is a front view of the base isolation apparatus applied under the lifting apparatus in the second embodiment.
Figure 29:
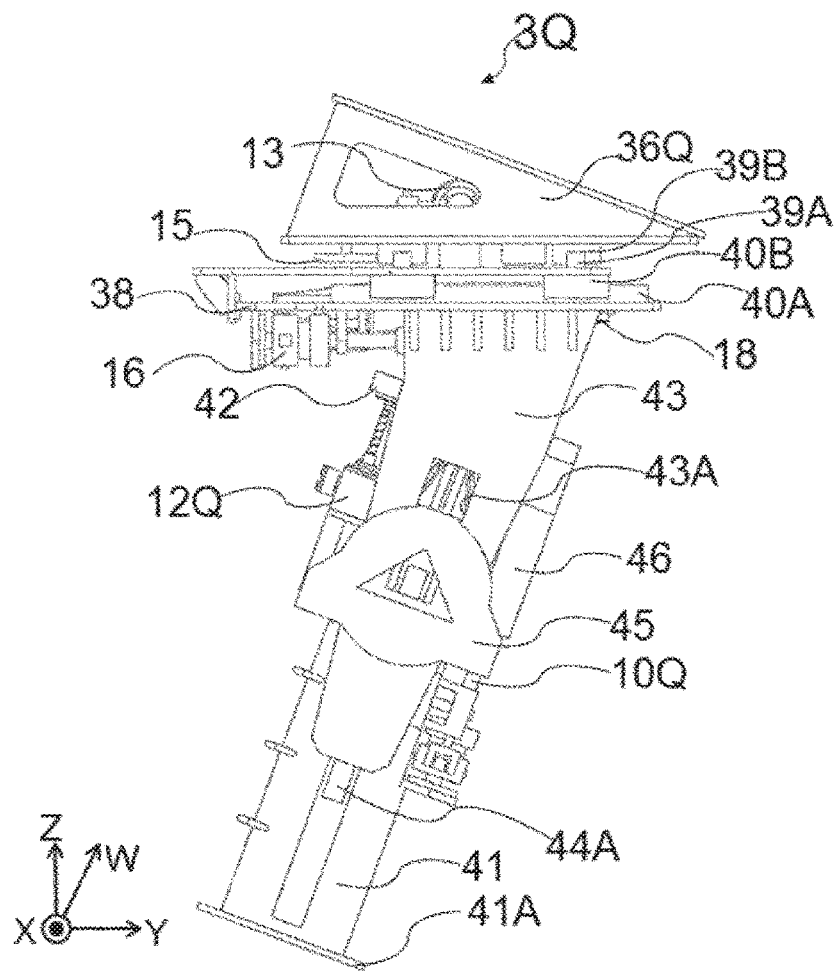
FIG. 29 is a side view of the base isolation apparatus applied under the lifting apparatus in the second embodiment.

Referring to FIGS. 27 to 29, a structure of base isolation apparatus 3Q applied under lifting apparatus 100Q is described. FIG. 27 is a perspective view, FIG. 28 is a front view, and FIG. 29 is a side view of base isolation apparatus 3Q.

The structure of base isolation apparatus 3Q differs from that in the first embodiment in that W-axis base isolation unit 7Q isolates the object from vibration in the W-axis direction, and Y-axis base isolation unit 9Q includes Y-axis preloaded spring 17Q. In other respects, base isolation apparatus 3Q is similar to base isolation apparatus 3 in the first embodiment. Differences are described in the following. The contour of a box 36Q is a triangular prism. Box 36Q appears to be a triangular prism as seen in the X-axis direction. The top surface of box 36Q is inclined at angle with respect to the horizontal plane, and mast 1Q is perpendicular to the top surface of box 36Q. The top surface of box 36Q supports mast 1Q in the direction perpendicular to mast 1Q. Other components including cylinder 41 are similar in structure to those in the first embodiment. W-axis base isolation unit 7Q is embedded in ground 71 in the W-axis direction. The angle formed between a top plate 42 of W-axis base isolation unit 7Q and a Y-axis reference plate 38 is $\xi$. A guide plate 43Q located under Y-axis reference plate 38 and extending in the W-axis direction is connected perpendicularly to top plate 42, and is connected obliquely to Y-axis reference plate 38. W-axis lock mechanism 10Q, W-axis preloaded spring 11Q, and W-axis damper 12Q are similar in structure to Z-axis lock mechanism 10, Z-axis preloaded spring 11, and Z-axis damper 12, except for the base isolation direction.

Figure 30:
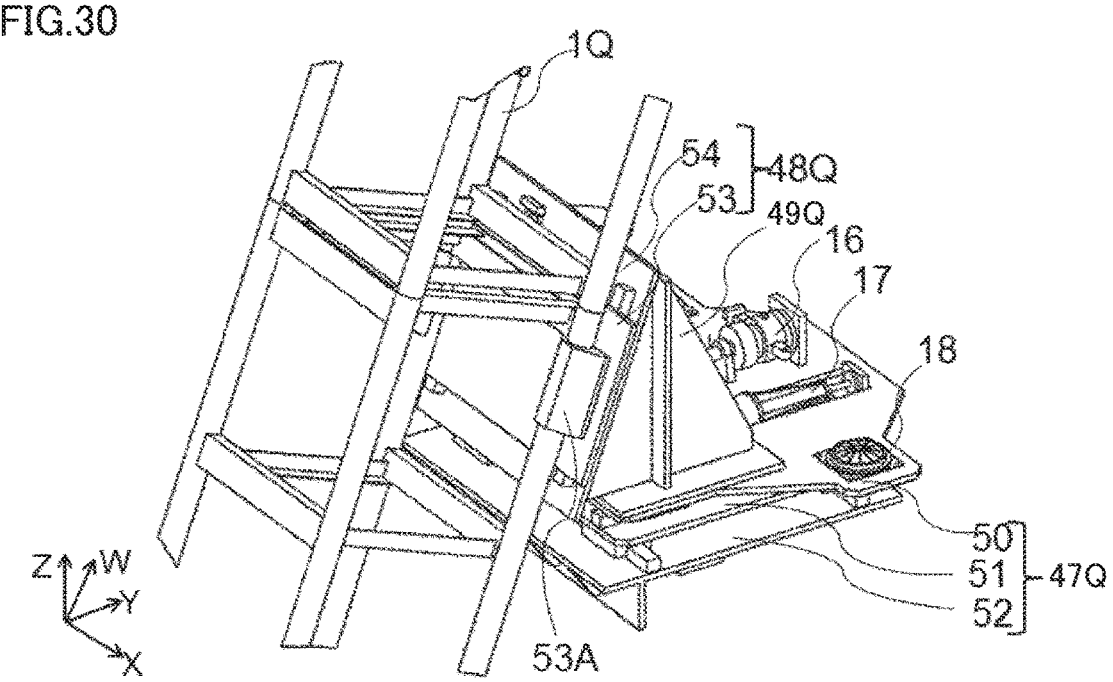
FIG. 30 is a perspective view of a base isolation apparatus applied to a place where the lifting apparatus in the second embodiment is supported by a building structure.
Figure 31:
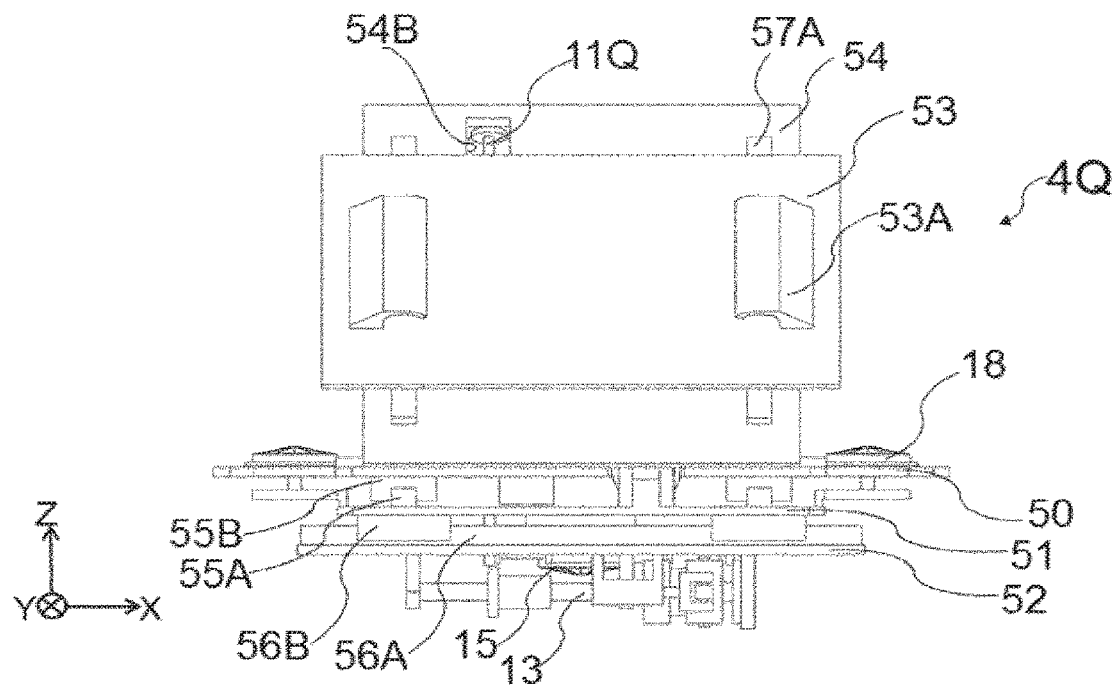
FIG. 31 is a front view of the base isolation apparatus applied to a place where the lifting apparatus in the second embodiment is supported by a building structure.
Figure 32:
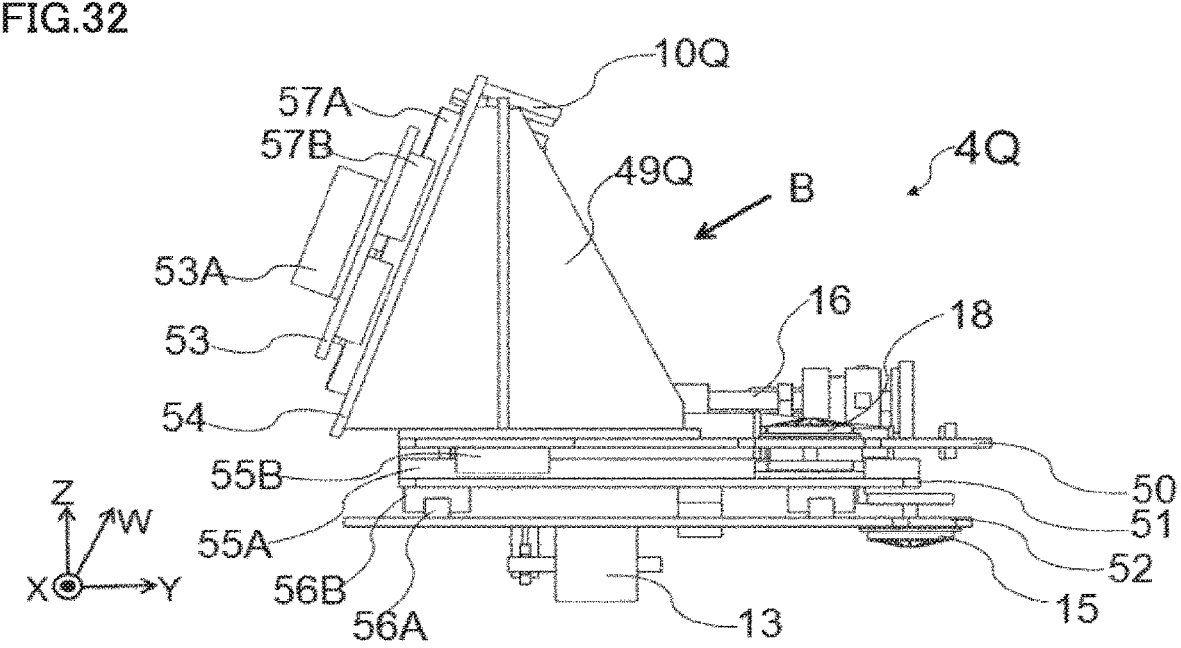
FIG. 32 is a side view of the base isolation apparatus applied to a place where the lifting apparatus in the second embodiment is supported by a building structure.
Figure 33:
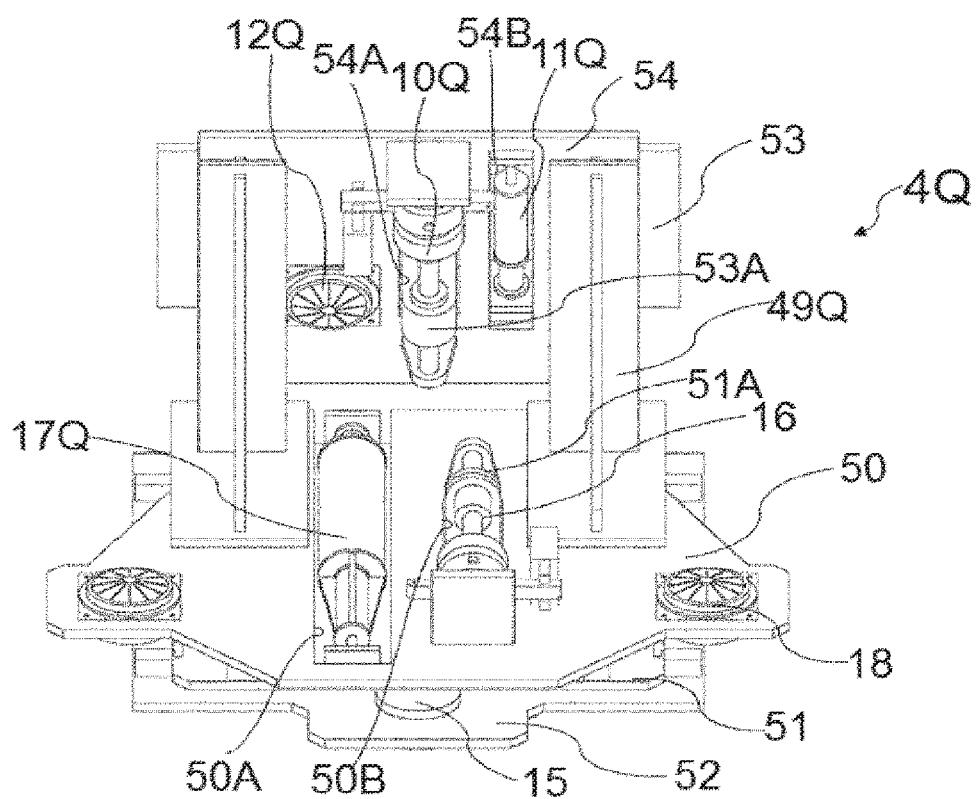
FIG. 33 shows a rear side of the base isolation apparatus, as seen from above obliquely, applied to a place where the lifting apparatus in the second embodiment is supported by a building structure.

Referring to FIGS. 30 to 33, a structure of base isolation apparatus 4Q mounted on a place of each floor of building structure 70Q where mast 1Q is supported by building structure 70Q is described. FIG. 30 is a perspective view, FIG. 31 is a front view, and FIG. 32 is a side view of base isolation apparatus 4Q, and FIG. 33 shows the rear side of base isolation apparatus 4Q as seen from above obliquely. FIG. 33 shows base isolation apparatus 4Q as seen in the direction of arrow B shown in FIG. 32.

The structure of base isolation apparatus 4Q differs from that of base isolation apparatus 4 in the first embodiment in that W-axis base isolation unit 7Q isolates the object from vibration in the W-axis direction, and Y-axis base isolation unit 9Q includes Y-axis preloaded spring 17Q. In other respects, base isolation apparatus 4Q is similar in structure to base isolation apparatus 4. A load-direction base isolator 48Q differs from vertical base isolator 48 in that the former isolates the object from vibration in the W-axis direction. In other respects, load-direction base isolator 48Q is similar in structure to vertical base isolator 48. A coupler 49Q coupling an intra-horizontal-plane base isolator 47Q and load-direction base isolator 48Q to each other has a shape of a combination of a substantially triangular plate member as seen in the X-axis direction and vertical reinforcement plates disposed on both sides of the plate member in the X-axis direction. Coupler 49Q as seen in the X-axis direction is made up of sections located on both sides with respect to the reinforcement plate, and these sections are each in the shape of a right triangle. In Y-axis preloaded spring 17Q, a preload is applied to the spring located on the side pushed from mast 1Q.

Base isolation apparatuses 3Q, 4Q operate similarly to base isolation apparatuses 3, 4 in the first embodiment. In the case where the load direction is not the vertical direction, W-axis base isolation unit 7Q which is a load-direction base isolation unit configured to isolate the object from vibration in the load direction can act to support and isolate mast 1Q from vibration in the load direction in which mast 1Q extends. Mast 1Q has a highest rigidity in the direction in which mast 1Q extends. The direction in which the highest rigidity is accomplished, i.e., the direction in which force is transmitted readily is defined as the base isolation direction, and accordingly, the object can be isolated effectively from vibration. The direction in which mast 1Q extends may not be identical exactly to the base isolation direction of W-axis base isolation unit 7Q, as long as the angular difference exists in a predetermined range.

The direction defined by projecting, on a horizontal plane, the direction in which mast 1 extends is defined as the Y-axis direction (second direction). Therefore, Y-axis base isolation unit 9Q includes Y-axis preloaded spring 17Q, and it is unnecessary to preload X-axis spring 14 of X-axis base isolation unit 8. Thus, the structure can be simplified as compared with the structure of base isolation apparatuses 3Q, 4Q in which X-axis spring 14 of X-axis base isolation unit 8 is preloaded additionally, and accordingly the cost is reduced.

The direction defined by projecting, on a horizontal plane, the direction in which mast 1 extends, may be a direction different from the first direction and the second direction. In this case, the first-direction base isolation unit and the second-direction base isolation unit may each include the preloaded spring. As to the magnitude of the preload, the preload value of each base isolation unit may be determined in the following way. The load applied to the base isolation apparatus is decomposed into a component in the load direction, which is the main-axis direction of the load-direction base isolation unit, and respective components of the first direction and the second direction in a horizontal plane. Then, the component of each force may be defined as the preload value of each base isolation unit. The preload value of the load-direction base isolation unit is the load-direction component of the load, the preload value of the first-direction base isolation unit is the first-direction component of the load, and the preload value of the second-direction base isolation unit is the second-direction component of the load.

In the present disclosure, the embodiments may be combined freely or each embodiment may be modified or omitted within the scope of the spirit of the disclosure.

REFERENCE SIGNS LIST 100, 100Q lifting apparatus; 70, 70Q building structure; 71 ground; 1, 1Q mast; 2, 2Q cage; 3, 3Q base isolation apparatus; 4, 4Q base isolation apparatus; 5 seismic sensor; 6, 6Q controller; 7 Z-axis base isolation unit (load-direction base isolation unit); 7Q W-axis base isolation unit (load-direction base isolation unit); 8 X-axis base isolation unit (first-direction base isolation unit); 9, 9Q Y-axis base isolation unit (second-direction base isolation unit); 10 Z-axis lock mechanism (lock device); 10Q W-axis lock mechanism (lock device); 11 Z-axis preloaded spring (distance recovery device); 11Q W-axis preloaded spring (distance recovery device); 12 Z-axis damper (vibration damper); 12Q W-axis damper (vibration damper); 13 X-axis lock mechanism (lock device); 14 X-axis spring (distance recovery device); 15 X-axis damper (vibration damper); 16 Y-axis lock mechanism (lock device); 17 Y-axis spring (distance recovery device); 17Q Y-axis preloaded spring (distance recovery device); 18 Y-axis damper (vibration damper); 19 structure connector (vibration-source connector); 20 ball screw housing; 21 screw rod; 22 ball screw nut (movable member); 23 clutch (switch device); 24 switch bar (switch device); 25 solenoid (switch device); 26 isolated-object connector; 27 nut connector; 28a compressive-side spring (compressive-side elastic body); 28b tensile-side spring (tensile-side elastic body); 29 partition wall; 30 casing (tensile-side casing, compressive-side casing); 30a, 30b end face; 30c, 30d opening; 31a shaft (compressive-side shaft); 31b shaft (tensile-side shaft); 32a pressure member (compressive force applicator); 32b pressure member (tensile-force applicator); 33 movable plate; 34 preload adjuster; 35 intra-horizontal-plane base isolator; 36, 36Q box (isolated-object connector); 36A opening; 36B opening; 37 X-axis reference plate (vibration-source connector, isolated-object connector); 37A protrusion; 37B protrusion; 37C protrusion; 38 Y-axis reference plate (vibration-source connector, isolated-object connector); 38A notch; 38B opening; 39A guide rail (guide); 39B holder (guide); 40A guide rail (guide); 40B holder (guide); 41 cylinder (vibration-source connector); 41A bottom plate (vibration-source connector); 41B protrusion; 41C protrusion; 41D protrusion; 42 top plate; 43, 43Q guide plate; 43A opening; 44A guide rail (guide); 44B holder (guide); 45 coupling plate; 46 frame; 47 intra-horizontal-plane base isolator; 48 vertical base isolator; 48Q load-direction base isolator; 49 coupler; 50 Y-axis movable plate; 50A opening; 50B opening; 51 Y-axis reference plate; 51A protrusion; 51B protrusion; 52 X-axis reference plate; 53 Z-axis reference plate; 53A protrusion; 53Q W-axis reference plate; 54, 54Q Z-axis movable plate; 55A guide rail (guide); 55B holder (guide); 56A guide rail (guide); 56B holder (guide); 57A guide rail (guide); 57B holder (guide)

The invention claimed is:

1. A base isolation unit comprising:
a vibration-source connector to be connected with a structure or a ground subjected to seismic vibration;
an isolated-object connector to be connected with an object to be isolated from vibration, the isolated-object connector being disposed movably with respect to the vibration-source connector in a predetermined base isolation direction;
a lock device disposed between the vibration-source connector and the isolated-object connector and configured to switch between a state of fixing the isolated-object connector with respect to the vibration-source connector and a state of making the isolated-object connector movable;
a distance recovery device disposed between the vibration-source connector and the isolated-object connector and configured to generate a force for causing an amount of change of a distance between the isolated-object connector and the vibration-source connector to approach zero, depending on the amount of change, the amount of change being a change from the distance in the state in which the lock device fixes the isolated-object connector with respect to the vibration-source connector, the distance recovery device including
a tensile-side elastic body being subjected to a pressure caused by an external force along the base isolation direction in an orientation of increasing the distance, and
a compressive-side elastic body being applied with a preload and being subjected to a pressure caused by the external force in an orientation of decreasing the distance; and
a vibration damper disposed between the vibration-source connector and the isolated-object connector and configured to generate a force in the orientation of decreasing the distance as the distance increases, and to generate a force in the orientation of increasing the distance as the distance decreases.

2. The base isolation unit according to claim 1, wherein the lock device includes:
a screw rod having an axis parallel with the base isolation direction, having two ends, each of the two ends being connected to the vibration-source connector or the isolated-object connector, and having an outer surface formed with male threads, the screw rod being configured to be rotatable about the axis;
a movable member having a through hole formed with female threads to engage with the male threads of the screw rod inserted in the through hole, the movable member being configured to move in a direction of the axis of the screw rod as the screw rod rotates, and having a fixed positional relation with one of the vibration-source connector and the isolated-object connector, the one of the vibration-source connector and the isolated-object connector not being a screw-rod-connected side connector to which the two ends of the screw rod are connected; and
a switch device configured to inhibit or enable rotation of the screw rod.

3. The base isolation unit according to claim 2, wherein the switch device includes:
a clutch configured to take a state of fixing the screw rod to the screw-rod-connected side connector and a state of enabling rotation of the screw rod; and
a latch solenoid configured to change the state of the clutch, and configured to maintain the state when no electricity is supplied.

4. The base isolation unit according to claim 1, wherein a magnitude of the preload is determined to satisfy a condition that a difference between a component resolved in the base isolation direction of a load applied from the object and the magnitude of the preload exists within a predetermined range.

5. A base isolation apparatus comprising:
a base isolation unit according to claim 4;
a load-direction base isolation unit being configured to isolate the object from vibration in the base isolation direction, the base isolation direction being a vertical direction;
a first-direction base isolation unit being configured to isolate the object from vibration in a first direction in a horizontal plane; and
a second-direction base isolation unit being configured to isolate the object from vibration in a second direction in the horizontal plane, the second direction being different from the first direction.

6. A base isolation apparatus comprising:
a base isolation unit according to claim 4;
a load-direction base isolation unit being configured to isolate the object from vibration in the base isolation direction, the base isolation direction being a load direction different from a vertical direction;
a second-direction base isolation unit being configured to isolate the object from vibration in a second direction defined by projecting the load direction on a horizontal plane; and
a first-direction base isolation unit being configured to isolate the object from vibration in a first direction in the horizontal plane, the first direction being different from the second direction.

7. A base isolation apparatus comprising:
a base isolation unit according to claim 4;
a load-direction base isolation unit being configured to isolate the object from vibration in the base isolation direction, the base isolation direction being a load direction different from a vertical direction;
a first-direction base isolation unit being configured to isolate the object from vibration in a first direction in a horizontal plane; and
a second-direction base isolation unit being configured to isolate the object from vibration in a second direction in the horizontal plane, the second direction being different from the first direction.

8. The base isolation unit according to claim 1, comprising a preload adjuster configured to change a magnitude of the preload applied to the compressive-side elastic body.

9. The base isolation unit according to claim 1, wherein the distance recovery device includes:
a tensile-side casing accommodating the tensile-side elastic body, and having an opening formed in an end face of the tensile-side casing in the base isolation direction, the opening being sized to prevent the tensile-side elastic body from getting out of the opening;
a compressive-side casing located on a side where the opening of the tensile-side casing does not exist, accommodating the compressive-side elastic body, and having an opening in an end face in the base isolation direction located on a side where the tensile-side casing does not exist, the opening being sized to prevent the compressive-side elastic body from getting out of the opening;
a tensile-side shaft extending through the opening of the tensile-side casing;
a tensile-force applicator disposed in contact with a side of the tensile-side elastic body, the side being located far from the opening of the tensile-side casing in the base isolation direction, the tensile-force applicator being connected to the tensile-side shaft for transmitting a force from the tensile-side shaft as a pressure to the tensile-side elastic body;
a compressive-side shaft extending through the opening of the compressive-side casing; and
a compressive-force applicator disposed in contact with a side of the compressive-side elastic body, the side being located near the opening of the compressive-side casing in the base isolation direction, the compressive-force applicator being connected to the compressive-side shaft for transmitting a force from the compressive-side shaft as a pressure to the compressive-side elastic body.

10. The base isolation unit according to claim 1, comprising a guide configured to guide the isolated-object connector to move in the base isolation direction.

11. A base isolation apparatus comprising:
a base isolation unit according to claim 1;
a load-direction base isolation unit being configured to isolate the object from vibration in the base isolation direction, the base isolation direction being a vertical direction;
a first-direction base isolation unit being configured to isolate the object from vibration in a first direction in a horizontal plane; and
a second-direction base isolation unit being configured to isolate the object from vibration in a second direction in the horizontal plane, the second direction being different from the first direction.

12. The base isolation apparatus according to claim 11, wherein
the load-direction base isolation unit is located below the first-direction base isolation unit and the second-direction base isolation unit, and
the base isolation apparatus is disposed under the object to be isolated from vibration.

13. The base isolation apparatus according to claim 11, wherein
the load-direction base isolation unit is located along the object to be isolated from vibration, and
the base isolation apparatus is disposed at a place where the structure supports the object.

14. A lifting apparatus comprising:
a mast extending vertically along a structure;
a cage being capable of carrying a person or an object and configured to move along the mast; and
a base isolation apparatus according to claim 11 disposed under each of the mast and at a place where the structure supports the mast, the base isolation apparatuses being configured to isolate the mast from vibration.

15. A base isolation apparatus comprising:
a base isolation unit according to claim 1;
a load-direction base isolation unit being configured to isolate the object from vibration in the base isolation direction, the base isolation direction being a load direction different from a vertical direction;
a second-direction base isolation unit being configured to isolate the object from vibration in a second direction defined by projecting the load direction on a horizontal plane; and
a first-direction base isolation unit being configured to isolate the object from vibration in a first direction in the horizontal plane, the first direction being different from the second direction.

16. The base isolation apparatus according to claim 15, wherein
the load-direction base isolation unit is located below the first-direction base isolation unit and the second-direction base isolation unit, and
the base isolation apparatus is disposed under the object to be isolated from vibration.

17. The base isolation apparatus according to claim 15, wherein
the load-direction base isolation unit is located along the object to be isolated from vibration, and
the base isolation apparatus is disposed at a place where the structure supports the object.

18. A lifting apparatus comprising:
a mast extending along a structure in a load direction different from a vertical direction;
a cage being capable of carrying a person or an object and configured to move along the mast; and
a base isolation apparatus according to claim 15 disposed under each of the mast and at a place where the structure supports the mast, the base isolation apparatuses being configured to isolate the mast from vibration.

19. A base isolation apparatus comprising:
a base isolation unit according to claim 1;
a load-direction base isolation unit being configured to isolate the object from vibration in the base isolation direction, the base isolation direction being a load direction different from a vertical direction;
a first-direction base isolation unit being configured to isolate the object from vibration in a first direction in a horizontal plane; and
a second-direction base isolation unit being configured to isolate the object from vibration in a second direction in the horizontal plane, the second direction being different from the first direction.

20. The base isolation apparatus according to claim 19, wherein
the load-direction base isolation unit is located below the first-direction base isolation unit and the second-direction base isolation unit, and
the base isolation apparatus is disposed under the object to be isolated from vibration.

21. The base isolation apparatus according to claim 19, wherein
the load-direction base isolation unit is located along the object to be isolated from vibration, and
the base isolation apparatus is disposed at a place where the structure supports the object.

22. A lifting apparatus comprising:
a mast extending along a structure in a load direction different from a vertical direction;
a cage being capable of carrying a person or an object and configured to move along the mast; and
a base isolation apparatus according to claim 19 disposed under each of the mast and a place where the structure supports the mast, the base isolation apparatuses being configured to isolate the mast from vibration.

* * * * *